June 21, 1960     B. HOWARD     2,942,065
TELEGRAPH PRINTER
Filed Dec. 13, 1957     10 Sheets-Sheet 1
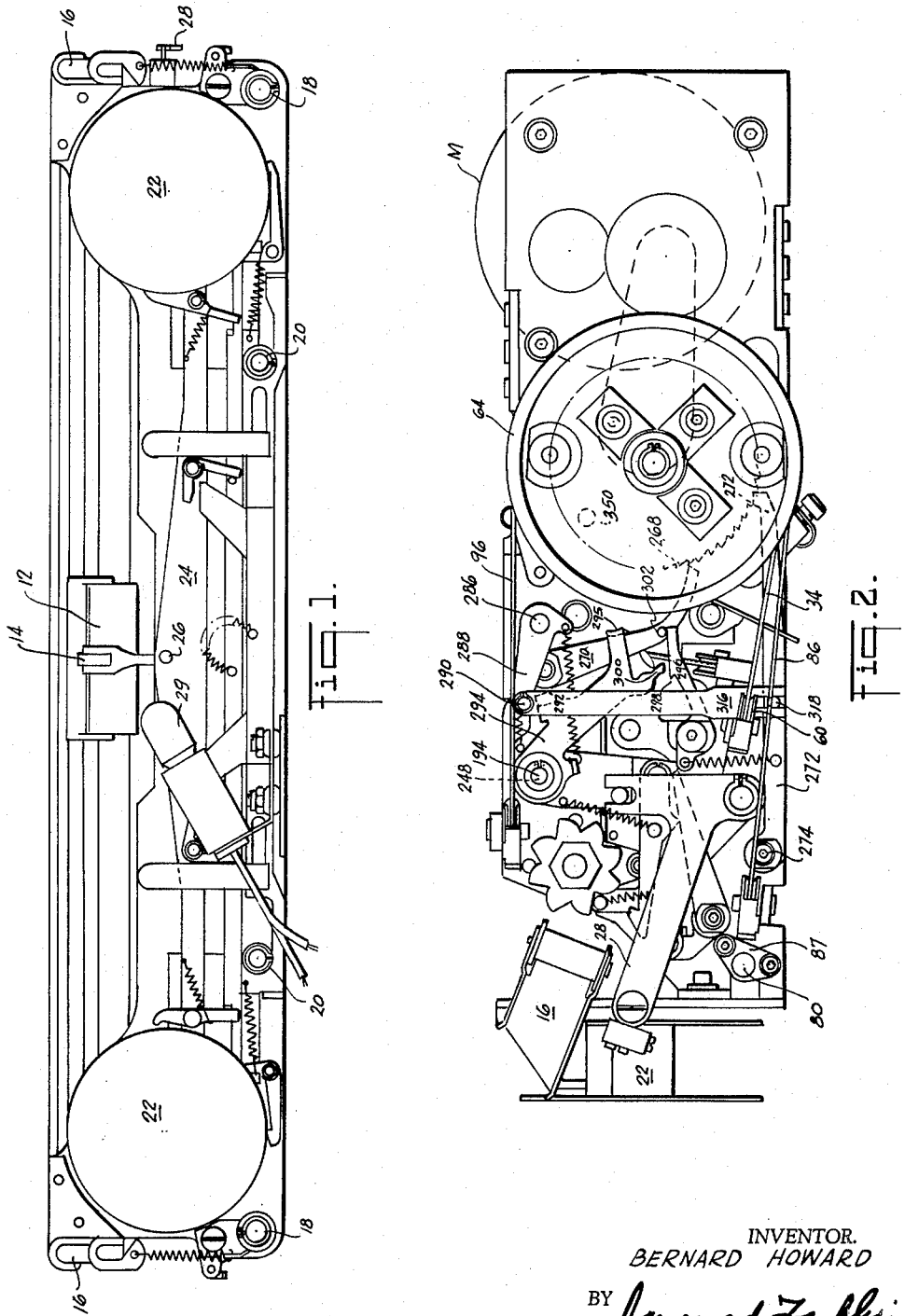
INVENTOR.
BERNARD HOWARD
BY James and Franklin
ATTORNEYS June 21, 1960
B. HOWARD
2,942,065
TELEGRAPH PRINTER
Filed Dec. 13, 1957
10 Sheets-Sheet 2
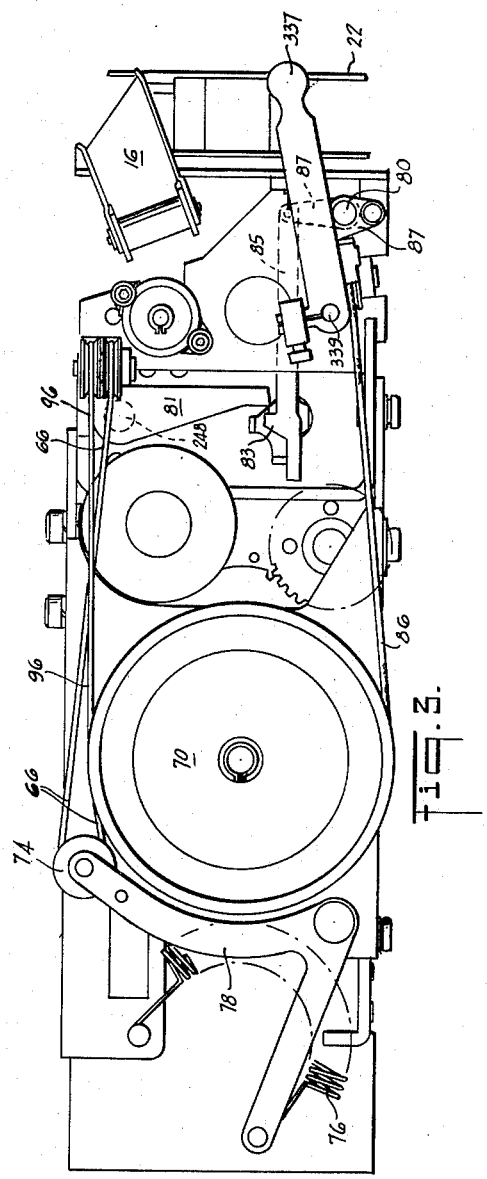
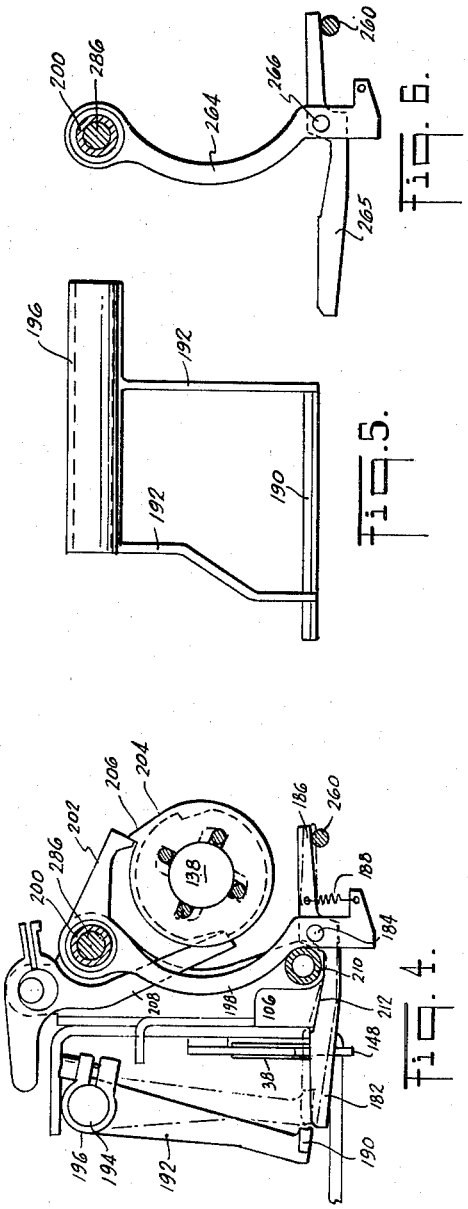
INVENTOR.
BERNARD HOWARD
BY James and Franklin
ATTORNEYS June 21, 1960

B. HOWARD 2,942,065

TELEGRAPH PRINTER

Filed Dec. 13, 1957

INVENTOR.
BERNARD HOWARD
BY
James and Franklin
ATTORNEYS

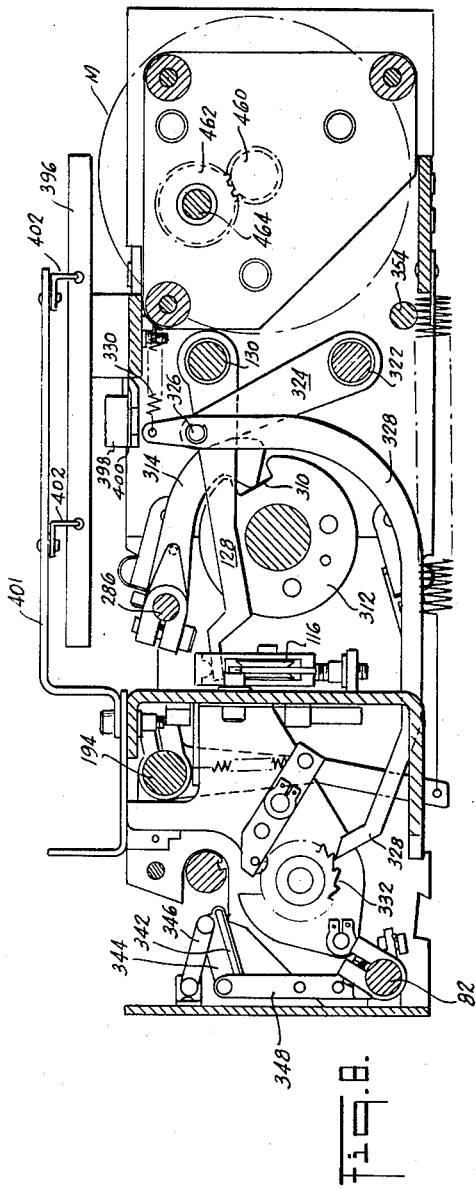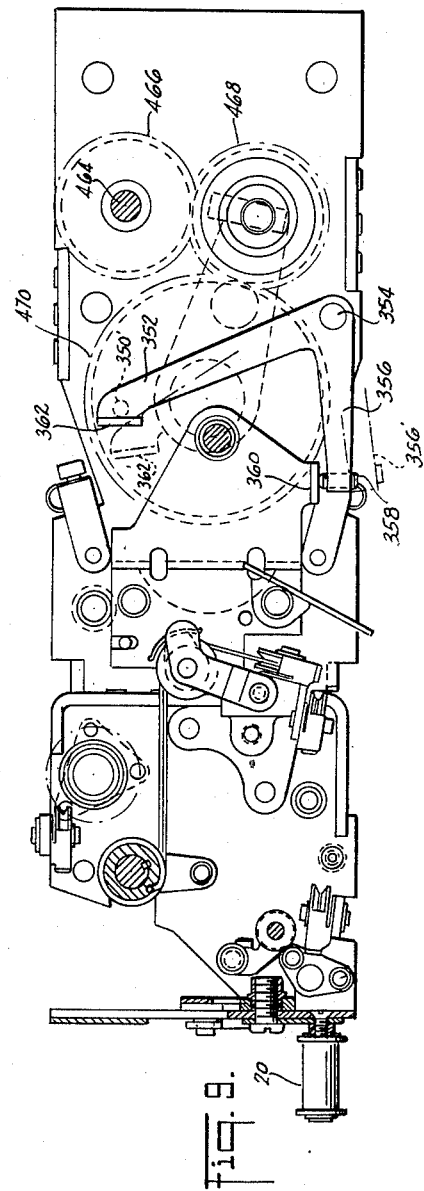

June 21, 1960
B. HOWARD
2,942,065
TELEGRAPH PRINTER
Filed Dec. 13, 1957
10 Sheets-Sheet 5
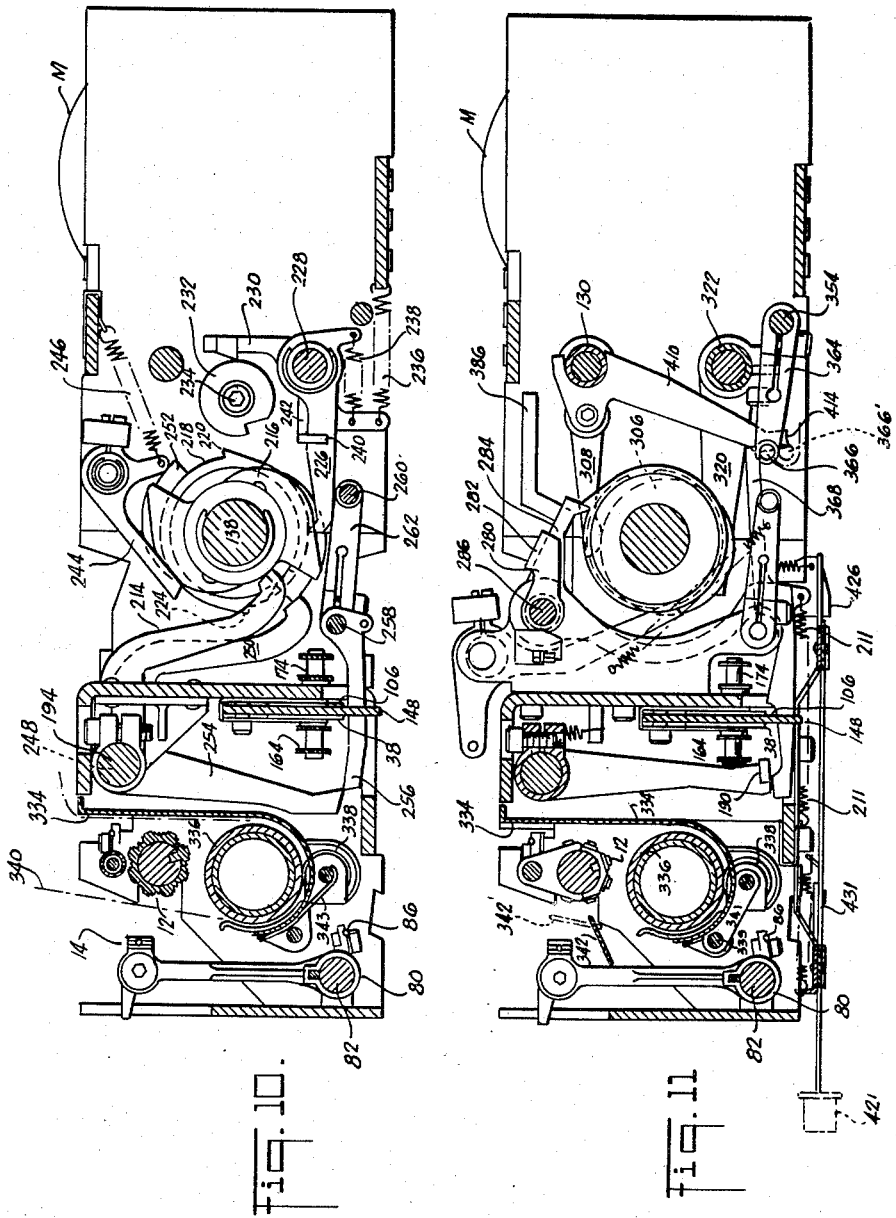
INVENTOR.
BERNARD HOWARD
BY James and Franklin
ATTORNEYS June 21, 1960
B. HOWARD
2,942,065
TELEGRAPH PRINTER
Filed Dec. 13, 1957
10 Sheets-Sheet 6
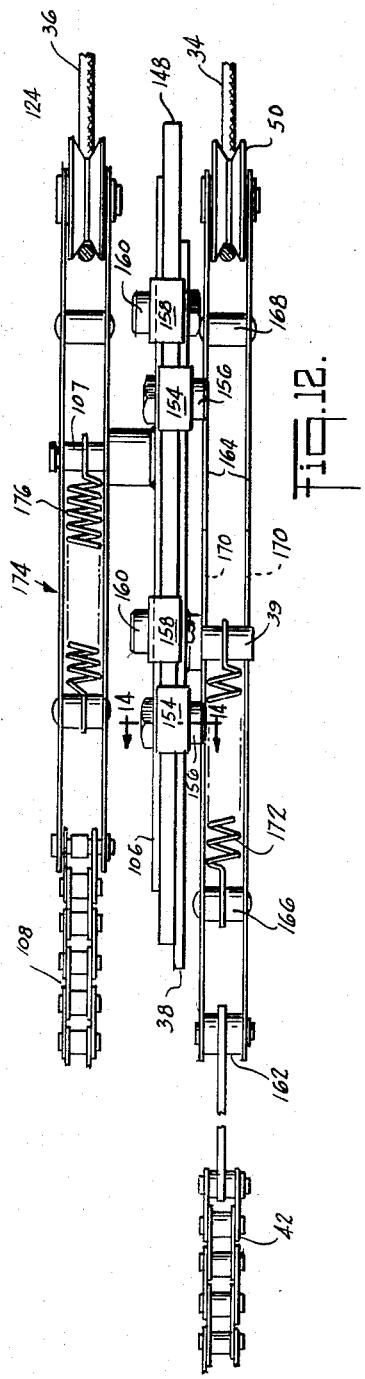
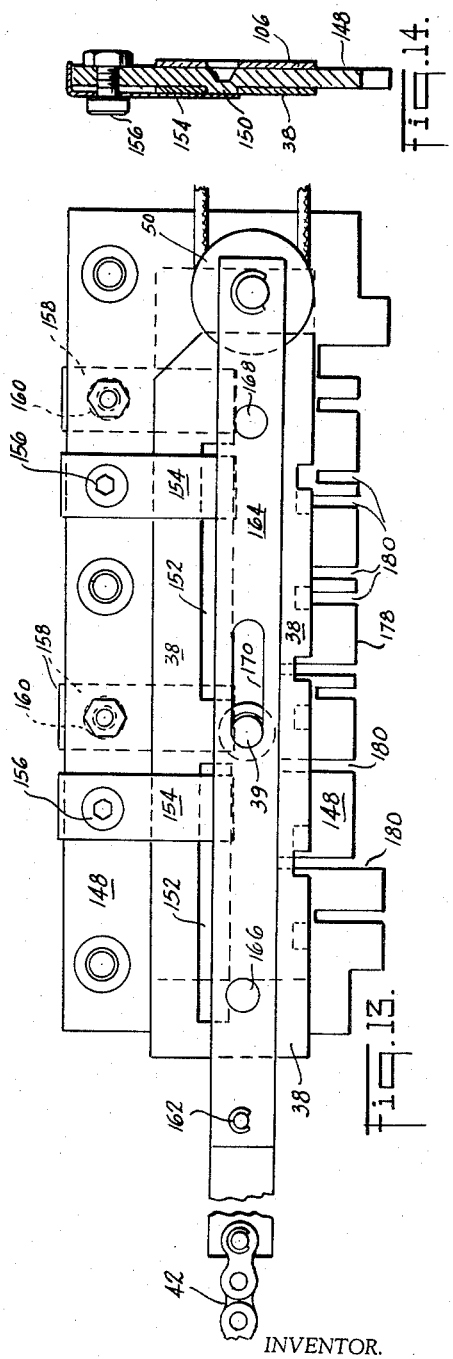
INVENTOR.
BERNARD HOWARD
BY
ATTORNEYS

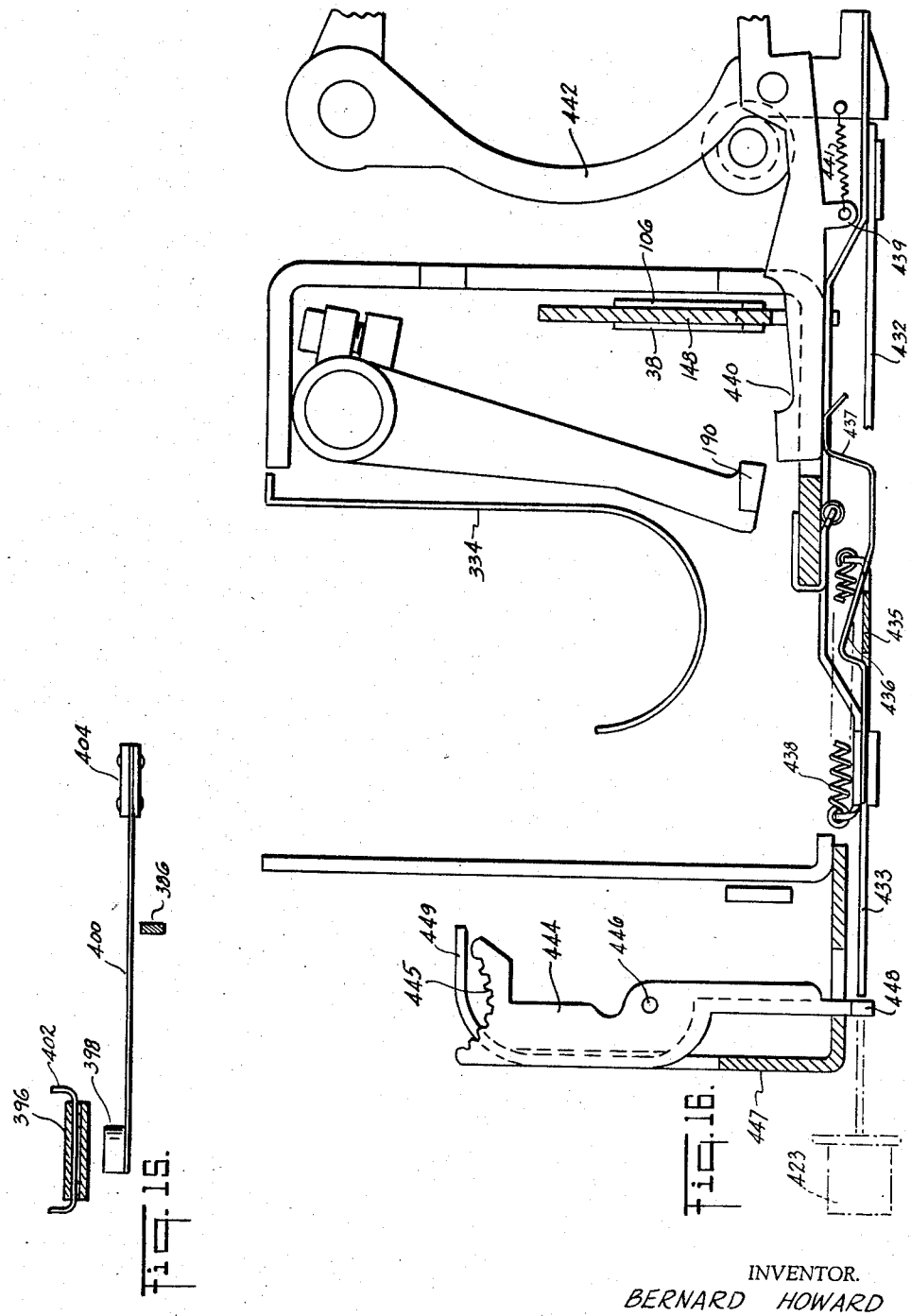

June 21, 1960  B. HOWARD  2,942,065
TELEGRAPH PRINTER
Filed Dec. 13, 1957  10 Sheets-Sheet 8
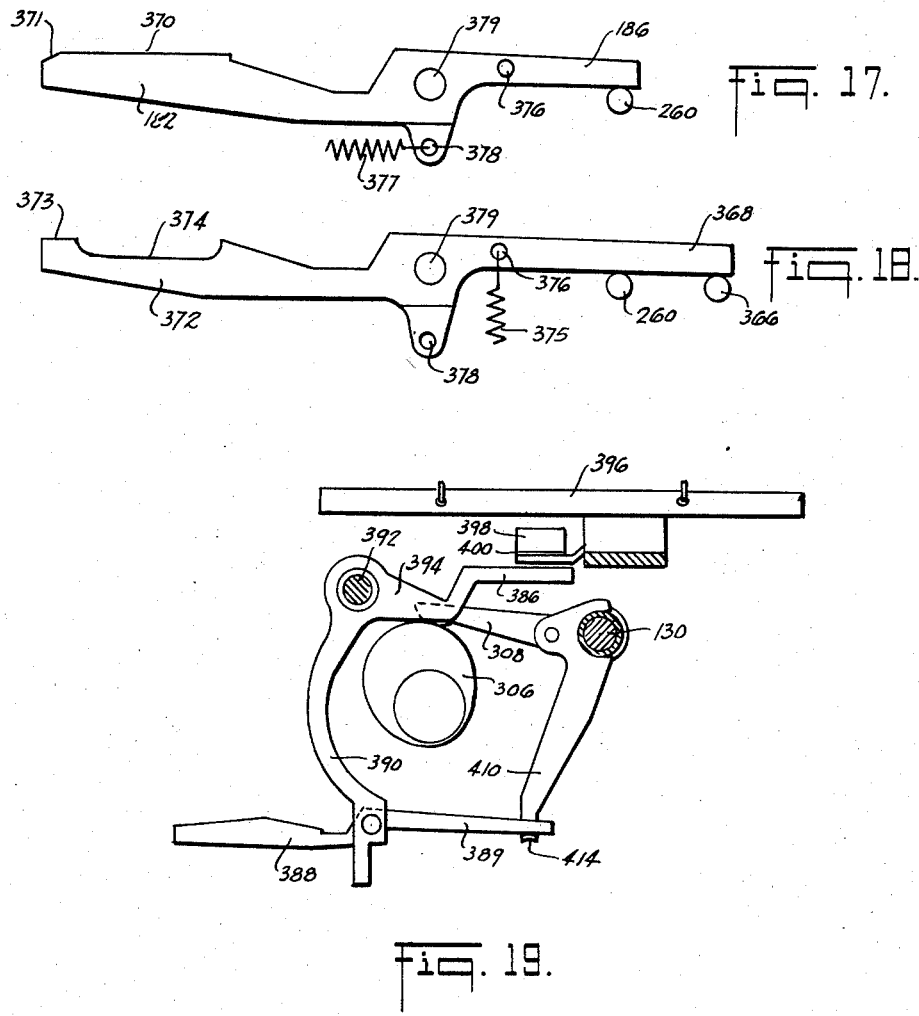
INVENTOR.
BERNARD HOWARD
BY James and Franklin
ATTORNEYS

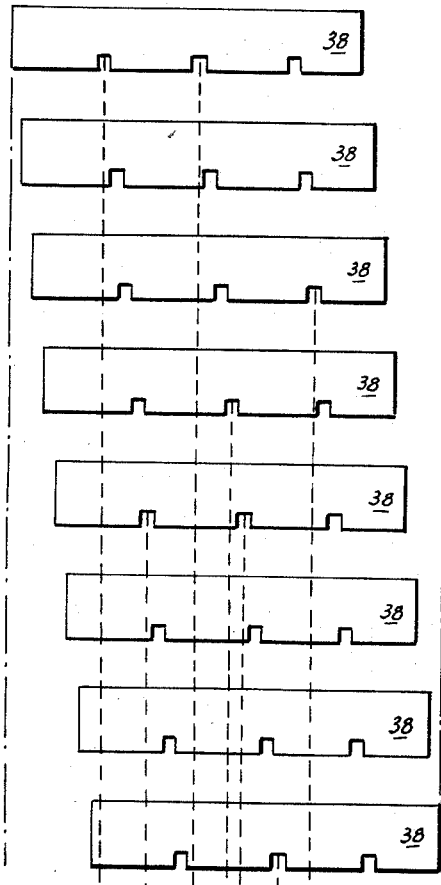
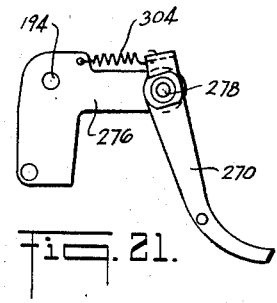
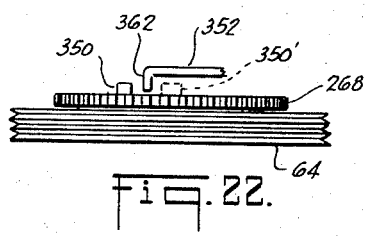
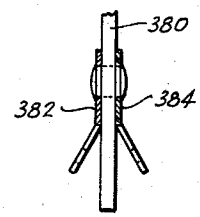
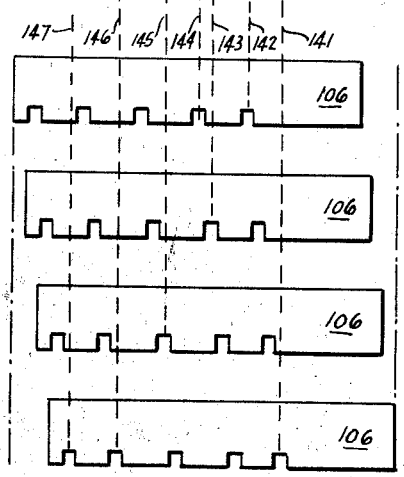

June 21, 1960

B. HOWARD 2,942,065

TELEGRAPH PRINTER

Filed Dec. 13, 1957

INVENTOR.
BERNARD HOWARD
BY
ATTORNEYS

United States Patent Office 2,942,065
Patented June 21, 1960

2,942,065

TELEGRAPH PRINTER

Bernard Howard, Ramsey, N.J., assignor to Teleprinter Corporation, Paramus, N.J., a corporation of New Jersey Filed Dec. 13, 1957, Ser. No. 702,727

38 Claims. (Cl. 178—35)

This invention relates to typewriting mechanism, and more particularly to a telegraph printer.

The primary object of the present invention is to generally improve telegraph printers. A more particular object is to improve the telegraph printer disclosed in my prior Patent 2,769,029, issued October 30, 1956. A still further object is to improve the so-called "special function" mechanism of the telegraph printer.

The telegraph printer of my aforesaid Patent 2,769,029 has a type cylinder which is moved axially by a first cable and selector pulleys, and which is rotated by a second cable and selector pulleys. In addition to the character selection thus provided, it is also desired to provide certain special functions controllable from the transmitter, which in the present telegraph printer include "carriage return," "line feed," "spacing," selection as between "letters" and "figures," and the ringing of a "bell." For this purpose, a first slide is moved longitudinally by the first cable, and a second collateral slide is moved by the second cable, and a particular combination of slide positions initiates one of the special functions.

In accordance with a feature and object of the present invention, the slides are made light in weight and nearly frictionless in motion. They are provided with notches along an edge. A plurality of probes are transversely movable into the notches when a notch in each slide is aligned with a probe. In preferred form, the probes are mounted for longitudinal movement also, and a cyclically powered pusher attempts to push the probes longitudinally, but is so disposed that it misses the probes except when a probe moves into the notches of the slides, and thus moves into the path of the pusher.

A further object of the invention is to avoid damage in the event of malfunction, for which purpose the connection of a cable to a slide is a lost motion connection which is accurate, yet is resiliently yieldable in the event of malfunction. A further object is to improve the cable system, for which purpose each slide is provided with a pulley which is connected to and movable with the slide. The cable for a slide is divided into two parts, one of which passes about the pulley. The cable for axial character selection of the type cylinder is also used for "character feed" of the type cylinder across the paper, that is, a step-by-step feed across the paper as successive characters are printed. For this purpose, one end of the cable may be connected to a character feed drum, and the other to a resilient take-up drum. A further object is to make the character selecting movement with little inertia, and independent of the character feed movement, for which purpose a part of the cable is passed about a light-weight resiliently mounted take-up pulley which accommodates the rapid back-and-forth movement of the type cylinder during character selection, without requiring any corresponding movement of the take-up drum.

A further object is to insure equal movement of the print hammer and the mean position (that is, the character feed position, independently of character selection) of the type cylinder. With this object in view, the print hammer is moved by a cable one end of which is connected to the aforesaid character feed drum, and the other end of which is connected to the aforesaid take-up drum. The possibility of doing this constitutes another advantage and reason for providing a separate take-up means for the character selection movement of the type cylinder cable, for otherwise separate drums would be needed for the hammer and cylinder. A still further object of the invention is to insure equal motion in either direction of the character feed drum and the take-up drum, and for this purpose, I provide a "return cable" connected between the drums, but wound in a direction opposite to that of the type cylinder and print hammer cables.

A further object of the present invention is to disable the print hammer during the performance of special functions. Still another object is to provide extra spacing between characters, as a special function, and in a simplified manner, for which purpose the print hammer is disabled, without more. Still another and converse object is to suppress the character feed during the performance of special functions other than the spacing function.

A still further object of the present invention is to provide for both automatic carriage return and line feed, when character feed has continued for the entire available distance, without carriage return being signalled from the transmitter. Still another object of the invention is to provide for the intrusion of manual local control of special functions.

To accomplish the foregoing general objects, and other more specific objects which will hereinafter appear, my invention resides in the telegraph printer elements, and their relation one to another, as are hereinafter more particularly described in the following specification. The specification is accompanied by drawings in which:

Fig. 1 is a front elevation of a telegraph printer embodying features of my invention, with the casing or protective housing removed;

Fig. 2 is a right end view thereof;

Fig. 3 is a left end view thereof;

Fig. 4 is a fragmentary section explanatory of a part of the special function mechanism;

Fig. 5 shows a pusher forming a part of the special function mechanism;

Fig. 6 shows a probe-carrying arm for "spacing";

Fig. 8 is a section taken approximately in the plane of the line 8—8 of Fig. 7, with the ribbon feed mechanism omitted in this and in the succeeding figures;

Fig. 9 is a section taken approximately in the plane of the line 9—9 of Fig. 7;

Fig. 10 is a section taken approximately in the plane of the line 10—10 of Fig. 7;

Fig. 11 is a section taken approximately in the plane of the line 11—11 of Fig. 7;

Fig. 12 is a plan view drawn to enlarged scale, and showing the relation of the special function slides to each other and to the cables;

Fig. 13 is a front elevation of the same;

Fig. 14 is a section taken at the line 14—14 of Fig. 12;

Fig. 15 is a schematic view explanatory of the bell ringing mechanism of the printer;

Fig. 16 is a fragmentary section drawn to enlarged scale, and taken approximately in the plane of the line 16—16 in Fig. 7;

Fig. 17 is an elevation of one of the probes of the function section;

Fig. 18 is an elevation of a cut away probe, with a prolonged tail;

Fig. 19 is a fragmentary section showing the bell ringing mechanism;

Fig. 20 is a diagrammatic view showing different relative positions of the notched slides for control of special functions;

Fig. 21 shows the character feed pawl;

Fig. 22 is a fragmentary plan view explanatory of the trip mechanism for automatic carriage return and line feed;

Fig. 23 is explanatory of how the clutch release arms for carriage return and line feed each carry two probes.

Figure 7:
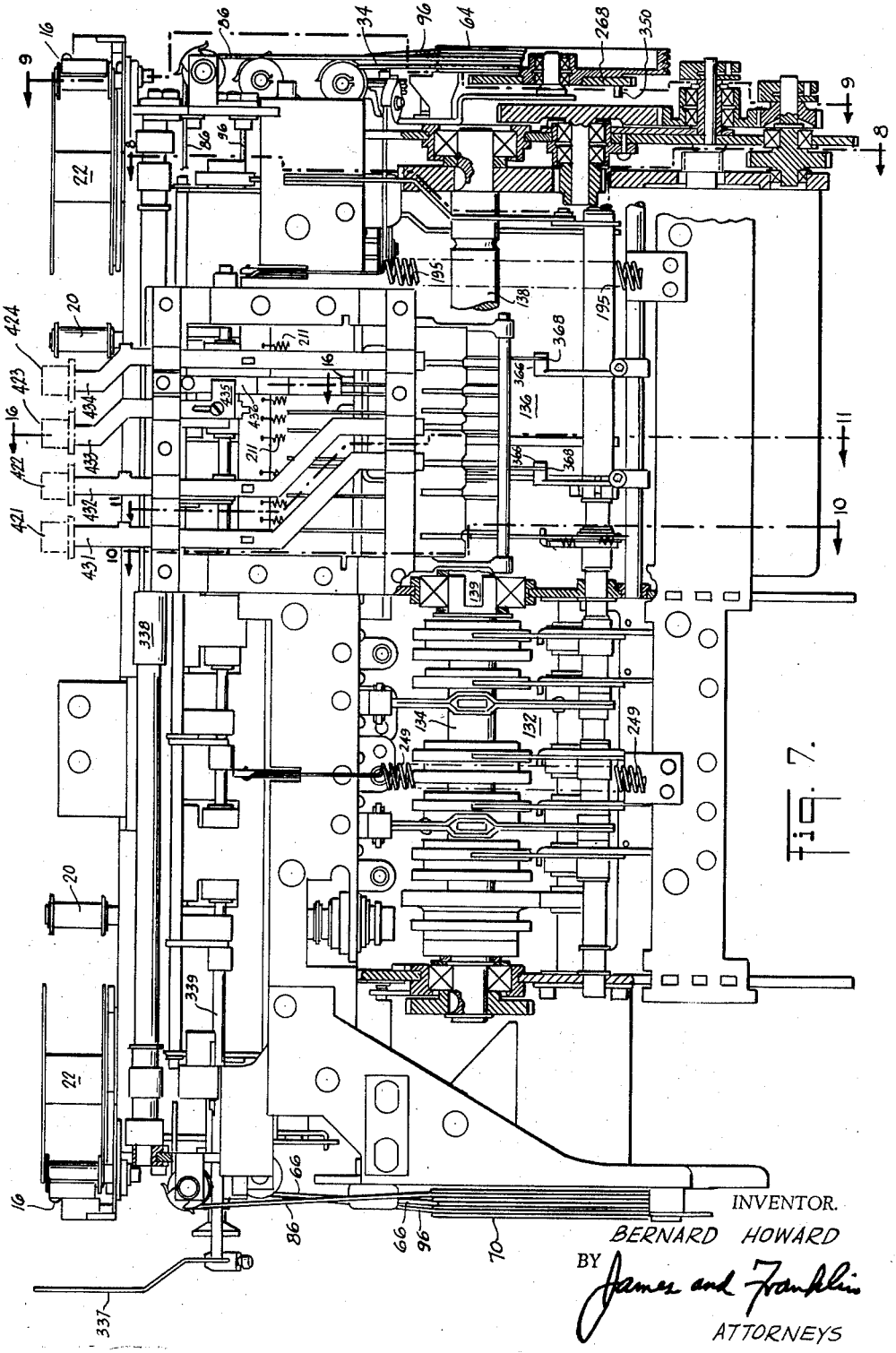
Fig. 7 is a bottom plan view of the printer.

Referring to the drawing, and more particularly to Fig. 1, the telegraph printer employs a type cylinder 12 which has a plurality of lines of characters about its periphery. The type is selected by moving the cylinder both axially and rotatably, and the selected character is printed by the striking action of a print hammer 14. The paper, and an ink ribbon (not shown), are disposed between the hammer and the type cylinder. The ink ribbon passes around end guides 16, and then downward to rollers 18, and inwardly to rollers 20 and outwardly to spools 22, either of which may be driven by pawl and ratchet mechanism. The ribbon feed mechanism is actuated by a rocker 24 pivoted at 26 and driven by a vertically reciprocable arm the end of which is shown schematically at 28. The ribbon feed mechanism is arranged to reverse the ribbon movement at the end of its travel, all of which is described in detail in my copending application Serial No. 662,371, filed May 29, 1957, and entitled "Type Writing Machine." A shaded lamp may be provided at 29. Arm 28 is better shown in Fig. 2.

The cable system

Figure 24:
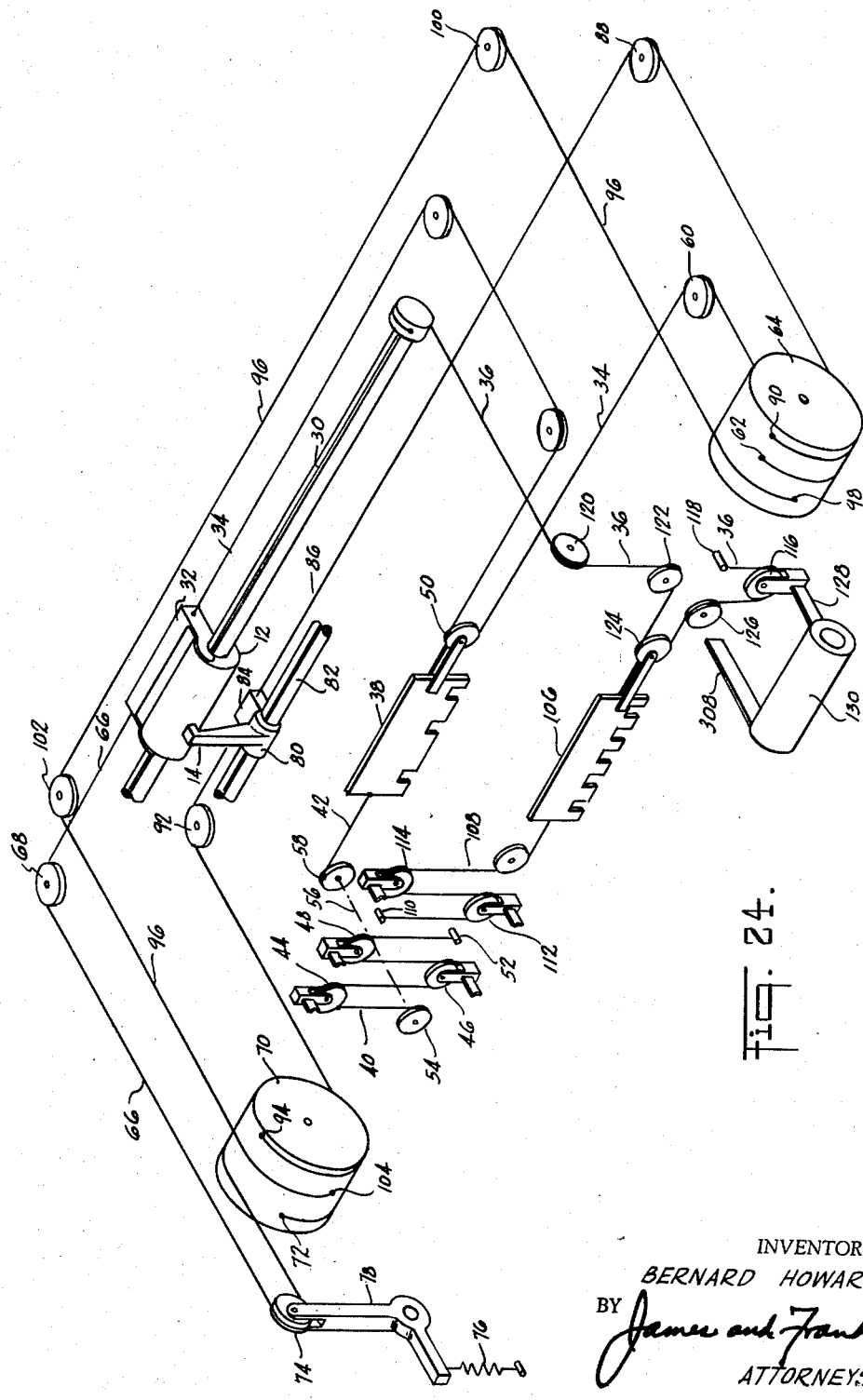
Fig. 24 is a schematic view drawn in perspective, and explanatory of the cable system of the printer.

Referring now to Fig. 24, this is a diagrammatic view explanatory of the cable system. It has been drawn with a view to clarity of the operation of the parts, and with close comparison to Fig. 23 of my Patent 2,769,029, and does not attempt to represent the true spatial relationship of the parts in the machine. It shows improvements since made. The type cylinder 12 is slidably keyed or splined for free axial movement on a shaft 30. It is axially moved by a yoke 32 connected to a cable 34. Shaft 30 is rotated by a cable 36. In a specific case, the type cylinder 12 has eight lines of characters, and each line is eight characters long. Cables 34 and 36 each provide eight selector positions.

These selector positions are determined by movement of groups of pulleys, each pulley having an "in" and an "out" position. The cable 34 is effectively divided into two parts on either side of and connected to, or in a sense separated by, a special function slide 38, the other cable part being indicated at 40. The latter for mechanical convenience has a portion offset at 42. The cable 40 is operated on by three movable pulleys 44, 46 and 48 carried at the ends of arms which are moved by half-revolution cams between "in" positions and "out" positions. The "in" position effectively lengthens the cable, and the "out" position effectively shortens the cable. The pulley motions are geometrically related, say $\%_{64}$ inch, $\%_{32}$ inch, and $\%_{16}$ inch, and in various combinations provide eight positions which are $\%_{64}$ inch apart. This motion is doubled by the action of pulley 50 on slide 38, thus providing eight positions which are $\%_{32}$ inch apart at the type cylinder.

One end of cable 40 is fixedly anchored at 52. The other end could be connected directly to slide 38, but because the latter is offset rearwardly somewhat, the end of cable 40 is connected instead to a wheel 54 connected by shaft 56 to a similar wheel 58, to which cable 42 is connected. In practice, the cables 40 and 42 are miniature roller chains, and the pulleys 44, 46, 48 and the wheels 54, 58 are sprocket wheels meshing with the chains 40 and 42. However, the cable 34 is light, flexible but inelastic cord, made for example of nylon.

The cable 34 serves not only for character selection, but also for character feed, and for this purpose, after passing around the pulley 50 and a guide pulley 60, the end of cable 34 is connected at 62 to a character feed drum 64. The latter is moved in step-by-step fashion by appropriate pawl and ratchet mechanism, thus shortening the cable 34, and moving the type cylinder across the paper. This movement is accommodated by the cable 66, which is a continuation of cable 34, and which extends around a guide pulley 68 to a resilient take-up drum 70, the cable being connected at 72. This would require rapid back-and-forth movement of the take-up drum 70, to accommodate character selection, and to avoid this, the cable 66 is additionally passed around a preferably lightweight take-up pulley 74, yieldably urged to the left by a spring 76 operating on a pulley arm 78. Thus, the rapid but limited back-and-forth movement of the type cylinder for character selection may be accommodated by take-up pulley 74, while the long range step-by-step movement of the type cylinder for character feed across the paper is taken up by the drum 70.

This has an additional advantage in that identical character feed movement may be provided for the hammer 14. This is mounted on a hub 80 which is keyed or splined for free axial movement on a shaft 82, and is connected at 84 to a cable 86 which is guided around pulley 88 to character feed drum 64, to which it is connected at 90. At its other end, cable 86 is guided around pulley 92, and is connected at 94 to take-up drum 70.

To insure identical movement of the drums 64 and 70, I provide a special return cable 96. One end is connected at 98 to drum 64. After passing around guide pulleys 100 and 102, the other end is connected to take-up drum 70 at 104. The return cable 96 is wound on the drums in a direction opposite to that of the type cylinder and print hammer cables. In this way, the drums are tied together for simultaneous equal movement in either direction regardless of speed of movement and inertia, as for example during carriage return. The cable arrangement also insures separation of the character selector movement taken up by the pulley 74, and the character feed movement afforded by drum 70. The latter may have a stronger spring than the spring 76, because the spring of drum 70 powers the carriage return. Nevertheless, drum 70 turns with drum 64, and without moving take-up pulley 74, because of the direct connections between the drums provided by the print hammer cable 86 and the return cable 96.

The cable 36 for rotating the type cylinder is similiarly divided into two parts connected to and separated by a special function slide 106. The other part of the cable is indicated at 108, and its free end is fixedly secured at 110. The cable then passes around selector pulleys 112 and 114. There is a third selector pulley 116, but this operates on the cable 36, the free end of which is fixedly secured at 118. Starting at shaft 30, the cable 36 passes around guide pulleys 120 and 122, leading to a pulley 124 which is movable with slide 106. Cable 36 then passes around a guide pulley 126 leading to the third selector pulley 116. The latter is moved between "in" and "out" positions by an arm 128 oscillatable at 130. Here again, the "in" and "out" motions of pulleys 112, 114 and 116 are geometrically related, with the maximum motion provided by pulley 116, sufficient to rotate the type cylinder 12 through one half revolution. In the present case, one semi-cylindrical half of the type cylinder carries "Letters," meaning the letters of the alphabet, while the other half of the cylinder carries "Figures," meaning numerals, punctuation, etc. Thus, the motion of pulley 116 provides a selection as between "letters" and "figures," and this selection is obtained as a special function.

The reason for, and the result of this arrangement, is that the five selector pulleys 44, 46, 48, 112 and 114 may be positioned in response to a five-pulse code, which obviously is preferable because it is simpler and faster than would be a six-pulse code. Certain combinations of pulses produce unique alignments of the special function slides 38 and 106, which may be used to produce certain special functions, and in the present case the selection of one-half or the other of the type cylinder, for letters or figures, is treated as a special function. Thus, the motion of pulley 112 may be, say 3/64 inch; of pulley 114 may be 3/32 inch; and the motion of a third pulley would be 3/16 inch, but because in the present case the pulley 116 does not have its motion doubled by the effect of pulley 124, the required motion is 3/8 inch.

As before, the pulleys 112 and 114 are preferably sprocket wheels, and cable 108 is a mating sprocket chain. However, the cable 36 is a highly flexible but inelastic cord, typically nylon.

The mechanism for moving the selector pulleys need not be described in detail herein. One useable mechanism is that described in my aforesaid Patent 2,769,029, but improved clutch and cam mechanism is described in my copending application Serial No. 637,184, filed January 30, 1957, and entitled "Multiple Clutch," while improved selector mechanisms for controlling the clutches in response to the incoming signal pulses are disclosed in my copending applications Serial No. 651,931, filed April 10, 1957, and Serial No. 652,179, filed April 11, 1957, both entitled "Selector for Telegraph Printer."

Referring now to Fig. 7 of the drawing, which is a bottom plan view of the printer, I may explain that the selector portion of the mechanism is located generally around the numeral 132, the main clutch drive shaft being indicated at 134. Preferably a series of half-revolution clutches move cams having followers, which position the selector pulleys between "in" and "out" positions, all in response to the incoming signal pulses. The special functions with which the present application is concerned are provided by a special function section located generally at the numeral 136. Here again, there is a main clutch drive shaft 138 which is a coaxial extension of the clutch drive shaft 134, and which similarly has clutches which when engaged drive cams, to produce one or another of the special functions. The shafts 134 and 138 are detachably joined at 139 by a tongue and slot connection.

The cable system shown in Fig. 24 improves on that shown in my Patent No. 2,769,029, in adding the low inertia take-up pulley 74; in providing single character-feed and take-up drums 64 and 70 to insure identical movement of the type cylinder and hammer; in providing the return cable 96; in providing pulleys 50 and 124 which are movable directly with the slides 38 and 106; in locating selector cable 34 outside the shaft 30 by means of a yoke 32; and in locating the print hammer cable 86 at the hub of the hammer where transverse movement of the cable is slight.

Only fractional portions of the cables are visible in other figures of the drawing, but reference may be made to Fig. 2, in which the return cable is shown at 96, and the hammer cable at 86. The print cylinder cable 34 is also shown. This turns inward at the pulley 60, because at this time, it runs to the slide 38. Referring to Fig. 3, the print cylinder cable is shown at 66, with its take-up pulley at 74. The return cable is shown at 96. The hammer cable is shown at 86.

Referring now to Fig. 7, the hammer cable is shown at 86; the return cable is shown at 96; the print cylinder cable at 66 at the left end; and at 34 at the right end of the drawing. The character feed drum 64, and the resilient take-up drum 70, each have three grooves for the three cables, the drums being large enough in diameter not to require more than one revolution.

*The special function section*

Reverting to Fig. 24, it will be seen that the slide 38 has three notches along its bottom edge, and that the slide 106 has five notches along its bottom edge. Fig. 20 shows the slide 38 in each of its eight positions, it being moved by three selector pulleys, and it shows the slide 106 in each of its four positions, it being moved by only two selector pulleys. This drawing also shows the edge notches, and it will be seen that these notches come into alignment in only a few combinations of positions indicated by vertical dotted lines extending between the slides. There are seven such vertical lines indicated at 141, 142, 143, 144, 145, 146 and 147. The alignment 141 produces carriage return; the alignment 142 produces "letters"; the alignment 143 sounds a bell; the alignment 144 produces "figures," the alignment 145 produces line feed; the alignment 146 is for "spacing"; and the alignment 147 is not made use of here, but is a blank or spare available to produce any desired additional function which may be wanted in a particular service.

Reference is now made to Figs. 12 and 13. The slides are shown at 38 and 106. They are mounted on each side of a stationary guide plate 148. The latter has two guide projections struck toward one side, as indicated at 150 in Fig. 14. These are received in mating tracks or slots 152 (Fig. 13) in slide 38, and afford longitudinal movement of the slide. The slide is held on guide plate 148 by a pair of thin leaf springs 154, mounted in position by screws 156. It will be understood that the other slide 106 is similarly slotted and guided by a pair of projections struck toward the opposite side, the slide 106 being held in position by a similar but displaced pair of springs 158, held in position by screws 160.

Referring now to Fig. 12, the slide 38 has a stud 39 projecting sidewardly therefrom, and in similar fashion, the slide 106 has a stud 107 projecting sidewardly therefrom. These afford connection to the cables (sprocket chains) 42 and 108 respectively, and also to the cables 34 and 36.

In preferred form, the cable connection to the slide is made accurate, but yieldable in the event of malfunction of the parts of the apparatus. More specifically, cable 42 is connected at 162 to a frame made up of parallel strips 164 and spacers 166, 168. The strips 164 are slotted, as best shown at 170 in Fig. 13, and the stud 39 passes through the slots 170. The stud is pulled to one end of the slots by a pull spring 172 (Fig. 12) housed between the strips 164, and having one end around the stud 30, and its other end around the spacer 166. The slots 170 are made long enough to accommodate the maximum travel of the cable 42.

The frame is further utilized as a mounting for the pulley 50 around which the nylon cable 34 passes. Thus, the cable 42 is connected to the pulley 50 by strips 164, and both are connected to the slide 38 by stud 39.

In generally similar fashion, the cable 108 is connected to a frame like that previously described, and generally designated 174. This too is longitudinally slotted, and stud 107 is received in the slots. The stud 107 is normally held accurately at one end of the slots by a pull string 176, thus yieldably connecting the cable 108 to the slide 106. The frame 174 also carries pulley 124, around which is passed the nylon cable 36 for rotational character selection.

Reverting now to Fig. 13, the mounting plate 148 has a lower edge 178 which is preferably lower than the slides, and which is vertically slotted as indicated at 180 to act as guides for a series of probes (not shown) which seek to move upward into the notches of the slides. The slots 180 serve to accurately locate the sideward positions of the probes. There are ten probes in all, the purposes of which are described later. They correspond to seven special functions, three of which have two probes each.

Referring now to Figs. 10 and 11, the stationary guide plate which carries the slides is shown at 148. The frames or strips connected to the slides are indicated at 164 and 174.

Referring to Fig. 4, a typical probe is shown at 182, it being pivoted at 184, and having a tail at 186. The probe tends to rise by reason of a pull spring 188. In the present case, the probes are also mounted for longitudinal movement, and a cyclically powered pusher 190 attempts to push the probes longitudinally, but is so disposed that it misses the probes except when a probe moves upwardly transversely of the slides, and thus moves into the path of the pusher. The pusher 190 is a bar mounted on spaced arms 192 oscillated by a function shaft 194, and Fig. 5 shows pusher bar 190 on its arms 192 which are connected by a sleeve 196.

The horizontal movement of probe 182 moves its pivot 184 to the right, thus oscillating an angle lever 198 which is itself pivoted at 200. The other arm 202 of the angle lever is a stop finger engaging the driven portion of a clutch 204 carried on a main clutch drive shaft 138. The particular clutch here shown is a single revolution clutch, and therefore has a single stop tooth 206. A back stop is provided at 208. The drawing also shows the clutch rollers which cooperate with sloping camming surfaces, whereby the clutch is driven by shaft 138 when stop finger 202 is moved outward or released. The details of the clutch construction and operation are fully described in my copending application Serial No. 637,-184 previously referred to.

In Fig. 4, attention is directed to the stationary tube 210, which cooperates with a sloping cam surface 212 on the probe 182. When the probe is pushed to the right, it is also moved downward by the camming action between the parts 210 and 212, thus disengaging the probe from the pusher 190, and permitting it to move back to the left, and thus permitting the stop finger 202 to move inwardly immediately after the clutch has been engaged. A spring, such as that shown at 211 in Fig. 11, or 377 in Fig. 17, tends to restore the clutch stop finger to operative position.

One end of a series of such springs is seen at 211 in Fig. 7. There are seven such springs, one for each function. They pull the probe to the left, and also turn it. A vertical spring such as that shown in Fig. 4 at 188 is not necessary. It is used on two extra probes which do not have horizontal springs because their companion probes do, and these two horizontal springs take care of two probes each for the horizontal movement, but not for the vertical movement.

The pusher 190 operates after completion of the five pulses making up a cycle of the code, and a special function (like a normal character printing) takes place after the five pulses and during the transmission of the next five pulses making up the next code cycle. The pusher 190 moves in once for each code cycle, regardless of whether or not a special function is to take place, and accordingly, the pusher may be and is itself used to hold the probe 182 downward slightly at a level which assures clearance beneath the slides 438 and 106, which are then free to move back and forth as dictated by the code pulses. The selection action takes place during the return or backward movement of the pusher, which is properly timed for that purpose. The probes have then been released from the pusher, by reason of the cam action at 210, 212 in Fig. 4, and have moved to the left beneath the pusher, which then serves to hold the probes down, while the slides are moved by their cables. When the pusher has moved all the way back, beyond the ends of the probes, the slides have already been moved to final position, and the probes try to rise, but cannot do so unless a special function has been signalled.

Pusher actuation

The pusher 190 (Fig. 4) is operated by shaft 194 which is oscillated once for each cycle. Referring now to Fig. 10, the special function shaft 194 is operated by a cam follower 214 cooperating with a two-lobed cam 216. The rise of the cam corresponds to the outer or left position of the pusher (190 in Fig. 4). The timing is such that the abrupt cam drop which corresponds to the working movement of the pusher does not take place until after completion of the five code pulses, and affords an opportunity for the probe 182 (Fig. 4) to rise into the notches of slides 38 and 106 should they happen to be both aligned with a probe. As the normal printing of characters proceeds, no probe rises, and the pusher actuation is idle. However, when a special function is called for, a probe rises and is pushed by the pusher, thereby releasing the stop finger carrying the particular probe, and consequently releasing the selected clutch, which turns a cam to produce the desired special function. The completion of that special function, once it has been started, is independent of the receipt of succeeding pulses, so that the overall speed of operation of the telegraph printer is not slowed by requiring a delay between cycles long enough for the function to take place. In general, this is true also of the printing of characters, and it may be said that in general the pulses set up the apparatus for a subsequent printing or special function which takes place during the receipt of a subsequent series of pulses which again set up the apparatus for a subsequent printing or special function.

The cam 216 (Fig. 10) is turned a half turn by a half-revolution clutch indicated at 218, and having stop teeth 220 and 224 located one hundred eighty degrees apart. The stop finger for clutch 218 is indicated at 226, and is an angle lever pivoted at 228. The other arm 230 is a cam follower cooperating with a timing or so-called "sequence" cam 232 rotated by a sequence shaft 234 which turns one revolution for each code cycle. For this purpose, it is geared to the main clutch drive shaft 138 by means of a gear train which itself includes a clutch which is released in proper synchronism with the transmitter. This is described in my patent 2,769,029 aforesaid, except that in the present case, the sequence shaft 234 is a full revolution shaft with one cam drop, instead of a half-revolution shaft with two cam drops, and therefore is geared in two-to-one ratio with clutch drive shaft 138, that is, the sequence shaft is turned one revolution by a half revolution of the clutch shaft 138.

In any event, the sequence shaft 234 has a series of sequence cams distributed along its length, and appropriately rotatably displaced from one another for proper timing of the operation of certain of the clutches, including the selector pulley clutches. The cam follower 230 is urged against the cam by a pull spring 236. The arms 226 and 230 may if desired, be separate arms yieldably held in proper relation by a pull spring 238, the relative position of the arms being determined by a stop 240 on an arm 242 formed integrally with arm 230, the said stop 240 bearing against arm 226. The clutch 218 may have a back stop indicated at 244, the latter being urged inward by a pull spring 246.

The push motion of the special function shaft or pusher shaft 194 is produced by a pull spring, best shown at 195 in Fig. 7. This acts when the cam (216 in Fig. 10) drops. The spring pulls the lower end of an arm depending from shaft 194.

Hammer disable

Referring to Figs. 10 and 11, the print hammer 14 has a hub 80 splined to a hammer shaft 82, and moved across the paper by a cable 86.

Referring now to Fig. 3, the end of the hammer shaft is shown at 80. It is operated by a print shaft 248, which oscillates an arm 81, which through abutment 83 slides a link 85 to the left. Link 85 is connected to an arm 87 at one end of hammer shaft 80. The parts 87 (Figs. 2 and 3) are stationary bearings for hammer shaft 80.

Reverting now to Fig. 10, the print shaft 248 is aligned end-to-end with the special function shaft 194, and the print shaft carries and is operated by a cam follower 250. This bears against and responds to a two-lobed cam 252 which is driven by the same clutch 218 which drives the other two lobed cam 216. Thus, the cam followers 214 and 250 are near one another, but one is on one end of the special function shaft 194, and the other on the adjacent end of the print shaft 248. Both cam followers are operated once for each code cycle in response to a half revolution of the clutch 218. There is a time displacement between the cams, as will be seen in the drawing, so that the print hammer operates a little later than the pusher.

The print shaft 248 further carries a depending stop arm 254. This normally rides above a stop 256 secured to a shaft 258.

Reverting now to Fig. 4, it will be recalled that each probe, such as the probe 182 there shown, has a tail 186. The tails all overlie a rod 260. When any probe rises, its tail pushes the rod 260 down, and referring now once more to Fig. 10, the rod 260 is carried by spaced arms 262 secured to shaft 258. It will thus be seen that when a special function is called for, the stop 256 rises into the path of stop arm 254, which then is held in the left position shown, thereby preventing the follower 250 from moving inward as print cam 252 turns. In other words, the print shaft 248 cannot respond, and therefore the print hammer 14 does not hit the paper against the type cylinder. Thus, there is no possibility of the hammer moving in during carriage return, line feed, or other such special function. The disabling of the print hammer also serves to take care of one of the special functions itself, namely, "spacing," as next described.

The actual printing motion of the print shaft 248 is produced by a pull spring, shown at 249 in Fig. 7. Thus, as viewed in Fig. 7 the end-to-end print shaft and function shaft are disposed with the print shaft to the left, and the function shaft to the right. The spring pulls the lower end of an arm depending from shaft 248.

"Spacing" and character feed

The keyboard at the transmitter has the usual spacer bar, and when the spacer bar is depressed, code pulses are sent out which align the special function slides 38 and 106 with a probe which is specifically intended to cause "spacing," that is, an extra space between characters.

Referring to Fig. 6, arm 264 is oscillatable on tubular bearing 200, exactly as described for arm 198 in Fig. 4, except that in Fig. 6, the arm 264 does not have a clutch stop finger. Instead, it serves solely to carry a probe like the probe 182 shown in Fig. 4, the said probe being pivoted at 266 on arm 264, and having a tail, etc., all as previously described.

When the spacer bar is depressed at the transmitter and sends out the proper code pulses, the probe on arm 264 is aligned with the slide notches and moves upward, and incidentally is later moved longitudinally by the pusher, although that is not essential in this one exceptional case. The upward movement alone causes its tail to push the rod 260 (Fig. 6) down, and reverting to Fig. 10, this moves arm 262, shaft 258, and so the stop 256 in the way of stop arm 254, thus disabling the hammer, so that no character is printed. In the meantime, however, the oscillation of the special function shaft 194 heretofore described as operating the pusher, also serves to produce character feed. It further serves to operate the ink ribbon feed mechanism.

From Fig. 24, it will be recalled that the character feed drum 64 is what moves the type cylinder and print hammer across the paper. Fig. 7 shows the character feed drum 64 with a ratchet wheel 268 secured thereto. Referring now to Fig. 2, the character feed drum 64 has a ratchet wheel 268 operated by a pawl 270. It is held against reverse movement by a long check dog 272 pivoted at 274. In Fig. 21 is will be seen that the function shaft 194 carries an arm 276, which in turn carries the pawl 270, the latter being pivoted at 278.

The regular cyclic operation of the character feed pawl 270 continues, but is accompanied by disabling of the print hammer, resulting in the desired spacing. Thus, the mere upward movement of a particular probe 265 (Fig. 6) especially intended for spacing, accomplishes the desired spacing by simply disabling of the print hammer. Incidentally, as mentioned above, the same parts cause disabling of the print hammer during every special function.

Character feed suppression

As indicated above, there is spacing during all normal printing, and there is spacing when called for at the transmitter in order to separate words and sentences, etc. However, it is preferred to suppress normal spacing during all of the special functions except the "spacing" function, because in all other cases spacing would not be appropriate. For example, the change from letters to figures would not necessarily include a space, lest there being two spaces instead of one between the last letter and the first figure (unless one wants an extra space, in which case the operator at the transmitter presses the spacer bar). Similar remark applies to other special functions. I therefore provide means to suppress character feed during all special functions other than the spacing function.

Referring now to Fig. 11, there is a generally U-shaped arm or yoke 280, the back 282 of which overlies all of the clutch stop fingers (like stop finger 284) in the special function section. The suppression yoke 280 is secured to a shaft 286, which is within the tubular shaft 200 previously referred to in Fig. 4 and Fig. 6. The clutch stop fingers are pivoted around the axis of tubular shaft 200.

In Fig. 11 the outward movement or release of any clutch stop finger, like 284, moves the yoke 280 with it, and so turns the shaft 286. This shaft extends all the way to the right end of the printer where it is linked to the character feed pawl.

Referring now to Fig. 2, the end of shaft 286 carries an arm 288 which has a pin 290 which overlies a surface 292 of an arm 294. Arm 294 is freely pivoted on shaft 194 and acts as a retractor. For this purpose it has a hook 295 which engages pawl 270, and it will be evident that the hook will pull the pawl 270 out of engagement with the ratchet wheel 268, thus interrupting or suppressing character feed.

Inasmuch as the movement of shaft 286 is momentary, whereas the movement of the feed pawl 270 is on a cam rise and therefore gradual, it is desirable to hold the feed pawl 270 disengaged for a longer time, and this is done by means of a detent 296, the tooth 298 of which catches a latch part 300 on retractor 294.

To release the detent 298, 300, a pin 302 is provided on pawl 270, and this pin bears against the top of an extension of detent 296. Thus, the idle pawl movement downward causes the pin 302 to disengage the detent tooth 298 from the latch 300, and the pawl 270 again moves into the teeth of the ratchet wheel 268 preparatory for the next regular character feed movement. The inward movement of pawl 270 is assured by a pull spring 304 shown in Fig. 21.

The movement of the shaft 286 which produces the character feed suppression is of course obtained as previously described with reference to Fig. 11, in which it will be recalled that outward movement of any clutch stop finger 284 causes a corresponding outward movement of the enveloping yoke 280, 282, which in turn is secured to the shaft 286. It will be recalled from Fig. 6 that the "space" probe 265 is mounted on an arm 264 which does not have a clutch stop finger, and thus the special function of "spacing" differs from the other special functions in not suppressing character feed (i.e. spacing), which is as it should be.

Letters and figures

If "letters" is signalled from the transmitter, the special function slides 38, 106 are aligned to permit a probe to rise, which then is pushed by the pusher to release a clutch which makes effective the letters half of the type cylinder.

Referring now to Fig. 11, for this purpose the clutch turns a cam 306 which has low and high sides one hundred eighty degrees apart. The cam operates a cam follower 308 secured to a tubular shaft 130.

Referring now to Fig. 8, the shaft 130 carries an arm 128 which in turn moves a selector pulley 116. The cam 306 in Fig. 11 turns a half revolution, thus moving the pulley 116 (Fig. 8) to either its "out" position which shortens the cable, or its "in" position which lengthens the cable. These parts are shown and similarly numbered in the cable diagram Fig. 24. The clutch for cam 306 (Fig. 11) is a half revolution clutch which differs slightly from the others in having two stop discs, each with one stop tooth, but with the discs and teeth one hundred eighty degrees apart. There is a stop finger for one disc, and another collateral stop finger for the other disc. Each stop finger forms a part of its own angle lever, and the other arm of each angle lever carries its own probe, one to produce "letters" as a special function, and the other to produce "figures" as a special function. As constructed and shown in Fig. 11, the large radius or outer position of the cam follower corresponds to letters, and the small radius or inner position of the cam follower corresponds to figures.

By making the selection as between letters and figures a special function, it becomes possible to operate the printer with a five-level or five-unit code, even though the type cylinder has sixty-four positions altogether, which would otherwise require a six-unit code.

Carriage return

When carriage return is signalled from the transmitter, the special function slides are moved to such positions that their bottom edge notches are aligned with a probe which produces carriage return. When this probe moves up, it is pushed longitudinally by the pusher bar, and so moves its angle lever and releases its clutch stop finger. In this case, the clutch is a full revolution instead of a half revolution clutch, and it turns a cam which has a single notch-like drop indicated at 310 on cam 312 in Fig. 8. In this case, the cam follower 314 has the sloping surfaces cooperating with the cam drop 310. The resulting quick outward movement of cam follower 314 turns the shaft 286 which, it may be recalled, is a long shaft extending all the way to the right end of the machine shown in Fig. 2. Shaft 286 there moves arm 288 carrying pin 290 which deflects the retractor 294 to momentarily disengage the character feed pawl 270 for character feed suppression.

In addition, the arm 288 and pin 290 carry an upright link 316, the lower end of which is bifurcated and straddles a short pin 318 on the check dog 272 of ratchet wheel 268. The bifurcation of the lower end of link 316 is long enough to provide a lost motion connection, so that the previously described movement of retractor 294 may take place for the single character feed suppression previously described, without releasing the check dog 272. However, the action of cam 312 (Fig. 8) on cam follower 314 produces a much bigger motion, which not only causes retraction of feed pawl 270, but also disengages the check dog 272. Reverting to the cable diagram in Fig. 24, when character feed drum 64 is thus released, the take up spring in the take up drum 70 at the other end of the machine (Fig. 3) pulls the cables 66 and 86 back, and so moves the type cylinder 12 and hammer 14 all the way back to the left margin of the paper. For convenience this action is here termed "carriage return," although the present printer has no carriage, and it is the type cylinder and hammer which return relative to stationary paper, rather than paper and paper carriage being returned as in an ordinary typewriter.

There is plenty of time for carriage return because there is a full revolution, corresponding to two code signals, for the type cylinder and hammer to return to initial position. The typist at the transmitter normally awaits completion of carriage return on her own machine, before resuming the typing of characters for the next line, and thus no characters are typed during the return movement of the carriage.

During character feed suppression, the partial or slight movement of shaft 286 (Fig. 8) causes a small outward movement of the cam follower 314 relative to the then stationary cam 312, but this is without consequence.

Line feed

For line feed, there is another probe which moves upward into the bottom edge notches of the special function slides when they are properly aligned with the probe. The pusher then pushes the probe longitudinally, thereby turning its angle lever and releasing a clutch stop finger, all as previously described. The clutch thereupon turns a cam to move a cam follower, and referring to Fig. 11, the cam follower for line feed is shown at 320. This is connected to a tubular shaft 322 which extends to a point near the right end of the machine. Referring now to Fig. 8, the tubular shaft 322 carries an arm 324 which is pivotally connected at 326 to a long pawl 328. The pawl tooth at its left end is normally urged upward by a pull spring 330 connected to the right end of the pawl above the pivot 326. Pawl 328 works against the teeth of a ratchet wheel 332 which is secured at one end of the paper feed roller.

Referring now to Figs. 10 and 11, the paper is fed alongside a sheet metal paper guide 334, the lower end of which is bent forwardly and upwardly around a paper feed roller 336. The paper is held frictionally against the roller 336 by means of small pressure rollers 338 which are resiliently urged upward. The paper then leaves, as shown in dot-dash lines at 340 in Fig. 10, the paper being disposed between the print hammer 14 and the type cylinder 12. The ink ribbon is retracted when not printing characters, as shown at 342 in Fig. 11, but at the moment of printing, it is moved arcuately upward to a working position shown at 342'. This motion is produced in a manner described in detail in my copending application Serial No. 662,371 previously referred to. However, the principle may be explained with reference to Fig. 8 of the drawing, because the ribbon 342 passes through a ribbon guide 344 which is supported at one end by a link 346, and at its other end by a generally upright arm 348, the lower end of which is secured to the hammer shaft 82 previously referred to. This linkage is duplicated at both ends of the machine outside the margins of the paper. The clockwise oscillation of the hammer shaft 82 is accompanied by an angular lift of ribbon 342 into the path of the hammer, as previously indicated at 342, 342' in Fig. 11.

Reverting to Fig. 8, it will be understood that the ratchet wheel 332 is disposed at one end of the paper feed roll or platen shown at 336 in Figs. 10 and 11, and consequently that actuation of line feed pawl 328 causes movement of the paper upward from one line to a next line.

The pressure of the small roller 338 on the main roll 336 may be relieved by a handle 337 (Figs. 3 and 7) at the left end of the machine. This is secured to a rod 339 carrying arms 341 (Fig. 11) which carry the rollers 338. The normal spring pressure is exerted by leaf springs shown at 343 in Fig. 10.

Automatic carriage return and line feed

Even though no signal is sent from the transmitter for carriage return and line feed, if the receiver reaches the end of a line so that it cannot print further, or in terms of the cable diagram of Fig. 24, if the character feed drum 64 has been turned to the limit of its movement, with the type cylinder moved to the right end of its shaft, provision is made for an automatic carriage return and line feed. In the present structure, this is accomplished in response to the physical rotation of the character feed drum.

Referring to Fig. 2, the character feed drum is shown at 64, and on the inside, within the periphery of ratchet wheel 268, there is a pin indicated at 350. Referring next to Fig. 9 of the drawing, which is a section taken just inside the drum, there is an angle lever 352, pivoted at 354, and the other arm 356 of which carries an adjustable stop screw 358 bearing against a stop ledge 360. The arm 352 has an offset or sidewardly bent abutment 362. Referring now to Fig. 22, the drum 64 and its ratchet wheel 268 carry a pin 350 which is adapted to bear in either direction against the abutment 362 on lever 352. After completion of carriage return, pin 350 moves lever 352 to the right, which corresponds to the solid line position shown in Fig. 9.

At the end of a line, after maximum travel afforded by the machine, the pin on reaching the dotted line position 350' (Fig. 22), bears on the abutment 362 from the right, and moves the abutment to the left, which corresponds in Fig. 9 to the change from solid to dotted line position marked 362'. The pivot 354 is a shaft which extends from the end of the machine inwardly to the function section, for a purpose which is next explained with reference to Fig. 11 of the drawing. Shaft 354 carries spaced arms 364 which carry a rod 366 which underlies the ends of two extra long probe tails 368. These are the tails of cut away probes which are not truly probes at all, in the sense that they do not probe whether or not slide notches are in alignment.

Referring to Figs. 17 and 18, a standard probe 182 performs its probing action at its top edge 370. The cut away probe 372 is proportioned generally like the standard probe 182, but differs in two main respects. One is that the top edge is cut away as indicated at 374, so that the probe can rise without regard to alignment of slide notches. The other is that the tail 368 is prolonged compared to the standard tail 186. A minor change which is also made is that the left end of the cut away probe may be lower and square, as shown, that is, it does not need the small bevel shown at 371 in Fig. 17. This bevel assures that the pusher may ride over the surface 370, and it will be recalled that the pusher itself helps keep the probe a little below the slides during the back-and-forth selection movement of the slides. In the case of the cut away probe, however, the top surface at 373 may be slightly lower, and is therefore cleared by the pusher, even without a bevel. There are two such probes.

In either case, a small upright pull spring 375 may be connected at 376, as shown in Fig. 18, or a generally horizontal pull spring 379 may be connected at 378, as shown in Fig. 17, to insure a tendency of the probe to move upward toward the slides, and to move to the left against the pusher. In practice both are pivoted at 379 on the same pivot, and therefore one horizontal spring on one, and one vertical spring on the other, are enough.

Reverting now to Fig. 11, when rod 366 is moved down to the broken line position 366', the cut away probes move upward and are then in a position to be pushed to the right by the pusher 190 (here shown in its right hand position, but idly so, because it is above the probes).

Referring now to Fig. 23, the clutch release arm 380 for carriage return, and similarly the clutch release arm for line feed, carries two collateral probes marked 382 and 384. One of these is a standard probe, and the other is a cut away probe with a long tail. Either probe may be pushed by the pusher. If carriage return and line feed are signalled from the transmitter in normal fashion, the regular probes rise into the slide notches, and are pushed by the pusher, thus engaging both clutches, and so turning the cams which produce carriage return and line feed as described above. If, however, the operator fails to signal carriage return and line feed by the end of the maximum travel, the pin 350' (Fig. 22) engages abutment 362, thus turning shaft 354 (Fig. 9), and so moving arms 364 (Fig. 11) and rod 366 downward, whereupon the two cut away probes rise and are pushed by the pusher to engage the clutches, thus producing carriage return and line feed.

Bell ring

For any desired or pre-arranged reason, as between transmitter and receiver, a bell at the receiver may be rung on striking an appropriate key at the transmitter. For this purpose, a key is used on the figure side of the drum, which key is also used for a letter on the letter side of the drum, and the particular one here used is the letter "S." The bell is disabled when the letter "S" is transmitted, but is rung by the same key when figures instead of letters have previously been indicated at the transmitter.

Referring now to Fig. 11, the bell is rung by a striker 386. This is operated by a probe and pusher, without requiring a clutch and cam drive of its own. Referring to Fig. 19, probe 388 is carried at the lower end of arm 390 of an angle lever pivoted at 392, much like the various clutch release arms previously described, but the other arm 394 of the angle lever is not a clutch stop finger, and instead is the bell striker 386 previously referred to. The bell itself may be a freely suspended bar 396, struck by a head 398 on a leaf spring 400, which in turn is struck by the striker 386. Referring now to Fig. 15, which is a fragmentary section through the bell bar 396, the latter is freely suspended on U-shaped wires 402 above the head 398 on leaf spring 400, the latter being fixedly mounted at 404. The striker 386 is beneath leaf spring 400.

When "Bell" is signalled from the transmitter, the cam 306 (Fig. 19) is low; the tail 389 is free; the probe 388 rises into the slide notches; and is pushed by the pusher, causing the strikers 386, 398 to ring the bell 396. The bell has been omitted in Fig. 11 in order not to unduly complicate the drawing, but is shown in Fig. 8, it being the bar 396, suspended by bracket 401 and short supports 402 above the head 398 of leaf spring 400.

As previously indicated, when the letter "S" is transmitted, the bell must not ring, and therefore is disabled. Referring to Fig. 19, cam 306 is engaged by a cam follower 308. The cam would be low, and the follower would move down during figures, as shown in Fig. 11, and the cam is high and the follower moves up as shown in Fig. 19 during transmission of "letters." In the latter case, the upward movement of the follower 308 causes a movement of arm 410 about pivot 130, which causes a hook 414 to move beneath the tail 389 of probe 388. The probe 388 then cannot rise, and consequently the pusher moves idly over the probe, and therefore cannot ring the bell.

Blank or spare

On analysis of the drawings, including particularly Figs. 7 and 20, it will be found that there are more special function elements than have so far been described. This is so because the function section includes an additional probe and clutch release arm which for the present may be termed "blank." This is simply a spare for future utilization, that is, for the convenience of anyone using the telegraph printer system who may want an additional special function which is unique to his own particular requirements. The "blank" position is shown by line 147 in Fig. 20.

Manual local control

The receiver or telegraph printer provides for manual local control of many of the special functions. Referring to Fig. 7, there are four control buttons 421, 422, 423 and 424 at the front of the printer. These may be small pull levers as is described later, but for the present purpose, and in respect to Fig. 7, it may be assumed that they are simple push buttons which are pushed inward to produce a desired special function. For this purpose, each button is mounted at the forward end of a longitudinally reciprocable strip or bar here marked 431, 432, 433 and 434 respectively. These bars are appropriately offset, as clearly shown in the drawing, to bring their inner ends to proper location or operative position. In the particular case here shown buttons are provided for line feed, carriage return, figures and letters. The line feed button is particularly convenient because the operator may wish to tear off a message or piece of paper between one message and the next, and in such case, he may want a rapid feed of paper out of the machine to provide adequate top and bottom margins when tearing off the message. By pressing and holding the line feed button, he will produce continuous feed of paper out of the machine for as long as he desires.

Manual local control of carriage return is also convenient. Manual local control of letters and figures is desirable to take care of a contingency in which the receiver is out of step with the transmitter in this regard, so that the receiving operator sees that nonsense figures or nonsense letters are being received, and surmises that what is required is a half turn of the print cylinder to put the two stations in register.

Referring now to Fig. 11, a typical push button, say 421, is mounted at the forward end of its strip 431, and the rear end of the strip is disposed immediately in front of the lower end 426 of an appropriate angle lever carrying a probe. (See Fig. 4 for the shape of the part.) It will be evident that by pushing the button 421, the angle lever is moved to the right exactly the same as though a probe had moved upward and been pushed to the right by the pusher bar 190.

This simple description applies to three out of four of the push buttons. Now, in the particular case of "letters," the situation is somewhat more complex, because if the letters button is pushed at a wrong time, it may result in jamming some parts of the machine.

Referring now to Fig. 16 of the drawing, the button 423 is connected to a stiff, flat strip 433, which is short compared to its companion strips, and which has a sideward offset 435, as is also shown in Fig. 7. This offset 435 underlies a thin bent resilient strip having a sloping cam part 436 (Fig. 16), and a vertically movable free end portion 437. The opposite end of the spring strip is fixedly mounted, and the strip bends in cantilever from the fixed mounting. When button 423 and strip 433 are pushed rearward, the offset 435 bears against the sloping camming surface 436, thereby raising the part 437, which bears against the bottom of a cutaway probe 440. This is mounted on the clutch stop arm 442 which controls the clutch stop finger which corresponds to letters, all as previously described. It will be recalled that there were two collateral stop fingers engaging a single clutch. One engaged a tooth on one side and the other a tooth 180 degrees away. Each finger is part of an angle lever carrying a probe, as shown in Fig. 4. One angle lever has the extra cut-away probe 440 in Fig. 16.

In other words, arm 442, like the arms for carriage return and line feed, has two probes, one a standard probe which enters the slide notches, and the other a cut-away probe 440 which may be nudged upward by manual local control. In the latter event, the probe then is pushed by the regular pusher bar 190, whereupon the type cylinder, is on "figures," is changed to "letters." The difference between this push button control and the others is that regardless of the time when the push button is operated, the movement of the clutch stop arm 442 does not take place until the pusher 190 is operated, and therefore is in proper synchronism or timing, as through resulting from a remote signal instead of from a local control button.

This precaution could be taken with the other local control buttons, but has not been found necessary. The probe 440 is urged downward instead of upward, by spring 441, acting on lug 439.

If button 423 is pressed while the pusher 190 has already moved to the right, the probe 440 cannot rise, but no harm is done because the spring 437 simply bends, and an instant later when the pusher 190 moves back to the left, the probe 440 then rises. This will happen even if the push button 423 is released in the meantime (which is unlikely because the printer works at high speed) for the reason that when spring 437 is bent against the offset 435 then underlying the flat part of the spring, the friction therebetween is sufficient to prevent return of strip 433, despite the release of button 423. This return is provided by a pull spring 438, acting the right end of on strip 433, and the spring is purposely kept weak.

Fig. 16 also shows a preferred form of lever button which is used for the four local controls, instead of the simple push button so far assumed. Specifically, there is a generally upright lever 444 pivoted at 446, and having its lower end 448 disposed in front of the end of either the strip 433, or one of the three strips 431, 432, and 434 (Fig. 7) previously described. A portion of the strip 432 at the right end of the strip is shown in Fig. 16. In either case, it will be evident that the operator places a finger on the upper end of the lever 444 and pulls the same forward. For this purpose the upper end 445 is concave and ridged. The part 447 is a stationary front plate, a part of which is cut away as shown at 449, to receive the four pivoted buttons or levers. These are disposed side by side on a single pivot rod 446.

The provision of manual local control is of great advantage. It provides for paper feed as described above. It provides for a shift as between letters and figures, thus enabling an operator to put his receiver in correct position in relation to the transmitter.

Moreover, some applications of the apparatus would involve the use of the receiver alone, without the transmitter. In such units, there would be no other way to perform these functions, because one could not resort to a keyboard to perform the same.

Finally, even when a local keyboard is available, the manual local controls are very important because they permit the functions to be performed "off line," that is, to be performed without generating a signal which is sent out on the line, and which would affect all other machines on the line.

General

The driving motor is indicated at M in Figs. 2, 8, 10 and 11. The gear train from the driving motor to the main cam shaft is partly shown in Fig. 8, including pinion 460 meshing with gear 462 on shaft 464. In Fig. 9, shaft 464 has a gear 466 meshing with gear 468 and gear 470. This in turn drives additional gearing, not shown, leading to the main cam shaft.

It is believed that the construction, operation and method of use of my improved telegraph printer, as well as the advantages thereof, will be apparent from the foregoing detailed description. Special functions are provided without requiring additional code units. These special functions are controlled by longitudinal reciprocable slides which are minimized in weight by using edge notches cooperating with probes. The main probe motion is itself produced under power drive by a pusher after a probe enters the notches. Yieldable cable connections avoid damage in the event of malfunction.

The feed movements of the type cylinder and print hammer are kept identical by separately taking up the character selection movement of the type cylinder. Identical movement of both drums is insured by provision of a return cable. The print hammer is disabled during special functions, and character feed is suppressed during special functions other than the "spacing" special function. There is a provision for automatic carriage return and line feed in the event that these are not signalled by the time the type cylinder has travelled as far as possible. Manual local control of special functions is provided for.

It will be apparent that while I have shown and described my invention in a preferred form, changes may be made without departing from the scope of the invention, as sought to be defined in the following claims.

I claim:

1. In a telegraph printer having a type cylinder, a first cable and selector pulleys to move the cylinder axially, a second cable and selector pulleys to rotate the cylinder, and special function mechanism comprising a first slide moved longitudinally by the first cable, a collateral slide moved longitudinally by the second cable, each of said slides having a plurality of transverse notches, and a plurality of probes extending transversely across said slides and movable in a direction transverse to both the probes and the slides into said notches when said notches are aligned with a probe.

2. In a telegraph printer having a type cylinder, a first cable and selector pulleys to move the cylinder axially, a second cable and selector pulleys to rotate the cylinder, and special function mechanism comprising a first slide moved longitudinally by the first cable, a collateral slide moved longitudinally by the second cable, each of said slides having a plurality of transverse notches, a plurality of probes transversely movable into said notches when aligned with a probe, said probes also being mounted for longitudinal movement, and a pusher to push said probes longitudinally but so disposed as to miss the probes except when a probe moves transversely of the slides into said notches and into the path of the pusher.

3. A telegraph printer as defined in claim 2, in which the connection between a cable and a slide includes a lost motion connection and a spring normally taking up the lost motion, whereby the connection is yieldable in the event of malfunction of the parts.

4. In a telegraph printer having a type cylinder, a first cable and selector pulleys to move the cylinder axially, a second cable and selector pulleys to rotate the cylinder, and special function mechanism comprising a first slide moved longitudinally by the first cable, a collateral slide moved longitudinally by the second cable, a plurality of probes transversely movable relative to the slides, the connection between a cable and a slide including a lost motion connection, and a spring normally taking up the lost motion, whereby the connection is yieldable in the event of malfunction of the parts.

5. A telegraph printer as defined in claim 2, in which said second cable is divided into two parts, one of which is connected to the second slide, and the other of which passes about a pulley which is connected to and movable with the second slide, one end of said second part being stationary and the other end of said second part being wound about a splined shaft carrying the type cylinder in order to rotate the same.

6. A telegraph printer as defined in claim 2, in which the first cable is divided into two parts, one of which is connected to the first slide, and the other of which passes around a pulley which is connected to and movable with said first slide, one end of the second part being connected to a character feed drum, an intermediate part being connected to the cylinder to move the same axially, another intermediate part passing about a yieldable take-up pulley which accommodates the axial character selection movements of the cylinder, and the other end of said second part being connected to a take-up drum.

7. A telegraph printer as defined in claim 2, in which the first cable is divided into two parts, one of which is connected to the first slide, and the other of which passes around a pulley which is connected to and movable with said first slide, one end of the second part being connected to a character feed drum, an intermediate part being connected to the cylinder to move the same axially, another intermediate part passing about a yieldable take-up pulley which accommodates the axial character selection movements of the cylinder, and the other end of said second part being connected to a take-up drum, a print hammer, a hammer cable for character feed of said print hammer, one end of said hammer cable being secured to the aforesaid character feed drum, and the other end of said hammer cable being secured to the aforesaid takeup drum.

8. A telegraph printer as defined in claim 2, in which the first cable is divided into two parts, one of which is connected to the first slide, and the other of which passes around a pulley which is connected to and movable with said first slide, one end of the second part being connected to a character feed drum, an intermediate part being connected to the cylinder to move the same axially, another intermediate part passing about a yieldable take-up pulley which accommodates the axial character selection movements of the cylinder, and the other end of said second part being connected to a take-up drum, a print hammer, a hammer cable for character feed of said print hammer, one end of said hammer cable being secured to the aforesaid character feed drum, the other end of said hammer cable being secured to the aforesaid take-up drum, and a return cable extending between said character feed drum and said take-up drum and having its ends secured thereto for rotation in opposite direction to the hammer and type cylinder cables.

9. In a telegraph printer having a type cylinder, a first cable and selector pulleys to move the cylinder axially, a second cable and selector pulleys to rotate the cylinder, and special function mechanism comprising a first slide moved longitudinally by the first cable, a collateral slide moved longitudinally by the second cable, a plurality of probes transversely movable relative to the slides, said first cable being divided into two parts, one of which is connected to the first slide, and the other of which passes around a pulley which is connected to and movable with said first slide, one end of the second part being connected to a character feed drum, an intermediate part being connected to the cylinder to move the same axially, another intermediate part passing about a yieldable take-up pulley which accommodates the axial character selection movements of the cylinder, and the other end of said second part being connected to a take-up drum.

10. In a telegraph printer having a type cylinder, a first cable and selector pulleys to move the cylinder axially, a second cable and selector pulleys to rotate the cylinder, and special function mechanism comprising a first slide moved longitudinally by the first cable, a collateral slide moved longitudinally by the second cable, a plurality of probes transversely movable relative to the slides, said first cable being divided into two parts, one of which is connected to the first slide, and the other of which passes around a pulley which is connected to and movable with said first slide, one end of the second part being connected to a character feed drum, an intermediate part being connected to the cylinder to move the same axially, another intermediate part passing about a yieldable take-up pulley which accommodates the axial character selection movements of the cylinder, and the other end of said second part being connected to a take-up drum, said second cable being divided into two parts, one of which is connected to the second slide, and the other of which passes about a pulley which is connected to and movable with the second slide, one end of said second part being stationary and the other end of said second part being wound about a splined shaft carrying the type cylinder in order to rotate the same.

11. In a telegraph printer having a type cylinder, a first cable and selector pulleys to move the cylinder axially, a second cable and selector pulleys to rotate the cylinder, and special function mechanism comprising a first slide moved longitudinally by the first cable, a collateral slide moved longitudinally by the second cable, a plurality of probes transversely movable relative to the slides, said first cable being divided into two parts, one of which is connected to the first slide, and the other of which passes around a pulley which is connected to and movable with said first slide, one end of the second part being connected to a character feed drum, an intermediate part being connected to the cylinder to move the same axially, another intermediate part passing about a yieldable take-up pulley which accommodates the axial character selection movements of the cylinder, and the other end of said second part being connected to a take-up drum, a print hammer, a hammer cable for character feed of said print hammer, one end of said hammer cable being secured to the aforesaid character feed drum, the other end of said hammer cable being secured to the aforesaid resilient take-up drum.

12. In a telegraph printer having a type cylinder, a first cable and selector pulleys to move the cylinder axially, a second cable and selector pulleys to rotate the cylinder, and special function mechanism comprising a first slide moved longitudinally by the first cable, a collateral slide moved longitudinally by the second cable, a plurality of probes transversely movable relative to the slides, said first cable being divided into two parts, one of which is connected to the first slide, and the other of which passes around a pulley which is connected to and movable with said first slide, one end of the second part being connected to a character feed drum, an intermediate part being connected to the cylinder to move the same axially, another intermediate part passing about a yieldable take-up pulley which accommodates the axial character selection movements of the cylinder, and the other end of said second part being connected to a take-up drum, a print hammer, a hammer cable for character feed of said print hammer, one end of said hammer cable being secured to the aforesaid character feed drum, the other end of said hammer cable being secured to the aforesaid resilient take-up drum, and a return cable extending between said character feed drum and said take-up drum and having its ends secured thereto for rotation in opposite direction to the hammer and type cylinder cables.

13. A telegraph printer as defined in claim 2, in which there is a main clutch drive shaft, a clutch thereon, a cam driven by said clutch, a means to release the clutch after completion of each cycle of signal pulses, a function shaft, a cam follower engaging said cam for oscillating said function shaft, and means whereby said function shaft moves the aforesaid pusher.

14. A telegraph printer as defined in claim 2, in which there is a print hammer, an ink ribbon, a ribbon feed mechanism, a main clutch drive shaft, a clutch thereon, a cam driven by said clutch, a means to release the clutch after completion of each cycle of signal pulses, a function shaft, a cam follower engaging said cam for oscillating said function shaft, means whereby said function shaft moves the aforesaid pusher, and means connected to said function shaft for also actuating said ribbon feed mechanism.

15. A telegraph printer as defined in claim 2, in which there is a print hammer, a character feed drum for moving said print cylinder and print hammer across the paper being printed, a main clutch drive shaft, a clutch thereon, a cam driven by said clutch, a means to release the clutch after completion of each cycle of signal pulses, a function shaft, a cam follower engaging said cam for oscillating said function shaft, means whereby said function shaft moves the aforesaid pusher, and means connected to said function shaft for also actuating pawl and ratchet mechanism for said character feed drum, and thereby causing character feed of the type cylinder and print hammer.

16. A telegraph printer as defined in claim 2, in which there is a print hammer, an ink ribbon, a ribbon feed mechanism, a character feed drum for moving said print cylinder and print hammer across the paper being printed, a main clutch drive shaft, a clutch thereon, a cam driven by said clutch, a sequence cam to release the clutch, a function shaft, a cam follower engaging said cam for oscillating said function shaft, means whereby said function shaft moves the aforesaid pusher once after completion of each cycle of signal pulses, means connected to said function shaft for also actuating said ribbon feed mechanism, and means connected to said function shaft for also actuating pawl and ratchet mechanism for said character feed drum, thereby causing character feed of the type cylinder and print hammer.

17. A telegraph printer as defined in claim 2, in which there is a print hammer, a character feed drum for moving said print cylinder and print hammer across the paper being printed, a main clutch drive shaft, a clutch thereon, a hammer cam and a pusher cam driven by said clutch, a function shaft, a cam follower engaging said pusher cam for oscillating said function shaft, clutch release means causing said function shaft to move the aforesaid pusher once after completion of each cycle of signal pulses, a hammer cam follower for operating said print hammer when the hammer cam drops, and means responsive to movement of any of said probes for disabling said print hammer.

18. A telegraph printer as defined in claim 2, in which there is a print hammer, a character feed drum for moving said print cylinder and print hammer across the paper being printed, a main clutch drive shaft, a clutch thereon, a hammer cam and a pusher cam driven by said clutch, a function shaft, a cam follower engaging said pusher cam for oscillating said function shaft, clutch release means causing said function shaft to move the aforesaid pusher once after completion of each cycle of signal pulses, a hammer cam follower for operating said print hammer when the hammer cam drops, means responsive to movement of any of said probes for disabling said print hammer, and one of said probes being a spacing probe which operates solely to disable said print hammer.

19. A telegraph printer as defined in claim 2, in which there is a print hammer, a character feed drum for moving said print cylinder and print hammer across the paper being printed, a main clutch drive shaft, a clutch thereon, a hammer cam and a pusher cam driven by said clutch, a function shaft, a cam follower engaging said pusher cam for oscillating said function shaft, clutch release means causing said function shaft to move the aforesaid pusher once after completion of each cycle of signal pulses, a hammer cam follower for operating said print hammer when the hammer cam drops, means connected to said function shaft for actuating pawl and ratchet mechanism for said character feed drum, thereby causing character feed of the type cylinder and hammer, a plurality of function clutches driving function cams and each having a clutch stop finger, and means responsive to release of any of said stop fingers for disengaging the character feed pawl from its ratchet in order to suppress character feed during special functions.

20. A telegraph printer as defined in claim 2, in which there is a print hammer, a character feed drum for moving said print cylinder and print hammer across the paper being printed, a main clutch drive shaft, a clutch thereon, a hammer cam and a pusher cam driven by said clutch, a function shaft, a cam follower engaging said pusher cam for oscillating said function shaft, clutch release means causing said function shaft to move the aforesaid pusher once after completion of each cycle of signal pulses, a hammer cam follower for operating said print hammer when the hammer cam drops, means responsive to movement of any of said probes for disabling said print hammer, means connected to said function shaft for actuating pawl and ratchet mechanism for said character feed drum, thereby causing character feed of the type cylinder and hammer, a plurality of function clutches driving function cams and each having a clutch stop finger, and means responsive to release of any of said stop fingers for disengaging the character feed pawl from its ratchet in order to suppress character feed during special functions.

21. A telegraph printer as defined in claim 2, in which there is a print hammer, a character feed drum for moving said print cylinder and print hammer across the paper being printed, a main clutch drive shaft, a clutch thereon, a hammer cam and a pusher cam driven by said clutch, a function shaft, a cam follower engaging said pusher cam for oscillating said function shaft, clutch release means causing said function shaft to move the aforesaid pusher once after completion of each cycle of signal pulses, a hammer cam follower for operating said print hammer when the hammer cam drops, means responsive to movement of any of said probes for disabling said print hammer, one of said probes being a spacing probe which operates solely to disable said print hammer, means connected to said function shaft for actuating pawl and ratchet mechanism for said character feed drum, thereby causing character feed of the type cylinder and hammer, a plurality of function clutches driving function cams and each having a clutch stop finger, and means responsive to release of any of said stop fingers for disengaging the character feed pawl from its ratchet in order to suppress character feed during special functions other than "spacing."

22. In a telegraph printer having a type cylinder, a first cable and selector pulleys to move the cylinder axially, a second cable and selector pulleys to rotate the cylinder, and special function mechanism comprising a first slide moved longitudinally by the first cable, a collateral slide moved longitudinally by the second cable, a plurality of probes transversely movable relative to said slides, a character feed drum for moving said print cylinder and print hammer across the paper being printed, a main clutch drive shaft, a clutch thereon, a hammer cam driven by said clutch, a hammer cam follower for operating said print hammer when the hammer cam drops, and means responsive to movement of any of said probes for disabling said print hammer.

23. In a telegraph printer having a type cylinder, a first cable and selector pulleys to move the cylinder axially, a second cable and selector pulleys to rotate the cylinder, and special function mechanism comprising a first slide moved longitudinally by the second cable, a collateral slide moved longitudinally by the second cable, a plurality of probes transversely movable relative to said slides, a character feed drum for moving said print cylinder and print hammer across the paper being printed, a main clutch drive shaft, a clutch thereon, a hammer cam driven by said clutch, a hammer cam follower for operating said print hammer when the hammer cam drops, and means responsive to movement of any of said probes for disabling said print hammer, one of said probes being a spacing probe which operates solely to disable said print hammer to produce "spacing."

24. In a telegraph printer having a type cylinder, a first cable and selector pulleys to move the cylinder axially, a second cable and selector pulleys to rotate the cylinder, and special function mechanism comprising a first slide moved longitudinally by the first cable, a collateral slide moved longitudinally by the second cable, a plurality of probes transversely movable relative to said slides, a character feed drum for moving said print cylinder and print hammer across the paper being printed, a main clutch drive shaft, a clutch thereon, a hammer cam driven by said clutch, and means for actuating pawl and ratchet mechanism for said character feed drum, thereby causing character feed of the type cylinder and print hammer, a plurality of function clutches driving function cams, and each clutch having a stop finger, and means responsive to release of any of said stop fingers for disengaging the character feed pawl from its ratchet in order to suppress character feed during special functions.

25. In a telegraph printer having a type cylinder, a first cable and selector pulleys to move the cylinder axially, a second cable and selector pulleys to rotate the cylinder, and special function mechanism comprising a first slide moved longitudinally by the first cable, a collateral slide moved longitudinally by the second cable, a plurality of probes transversely movable relative to said slides, a character feed drum for moving said print cylinder and print hammer across the paper being printed, a main clutch drive shaft, a clutch thereon, a hammer cam driven by said clutch, a hammer cam follower for operating said print hammer when the hammer cam drops, and means responsive to movement of any of said probes for disabling said print hammer, and means for actuating pawl and ratchet mechanism for said character feed drum, thereby causing character feed of the type cylinder and print hammer, a plurality of function clutches driving function cams, and each clutch having a stop finger, and means responsive to release of any of said stop fingers for disengaging the character feed pawl from its ratchet in order to suppress character feed during special functions.

26. In a telegraph printer having a type cylinder, a first cable and selector pulleys to move the cylinder axially, a second cable and selector pulleys to rotate the cylinder, and special function mechanism comprising a first slide moved longitudinally by the first cable, a collateral slide moved longitudinally by the second cable, a plurality of probes transversely movable relative to said slides, a character feed drum for moving said print cylinder and print hammer across the paper being printed, a main clutch drive shaft, a clutch thereon, a hammer cam driven by said clutch, a hammer cam follower for operating said print hammer when the hammer cam drops, and means responsive to movement of any of said probes for disabling said print hammer, one of said probes being a spacing probe which operates solely to disable said print hammer, and means for actuating pawl and ratchet mechanism for said character feed drum, thereby causing character feed of the type cylinder and print hammer, a plurality of function clutches driving function cams, and each clutch having a stop finger, and means responsive to release of any of said stop fingers for disengaging the character feed pawl from its ratchet in order to suppress character feed during special functions other than "spacing."

27. A telegraph printer as defined in claim 2, in which there is a print hammer, a character feed drum for moving said print cylinder and print hammer across the paper being printed, a main clutch drive shaft, a clutch thereon, a pusher cam driven by said clutch, a function shaft, a cam follower engaging said pusher cam for oscillating said function shaft, clutch release means causing said function shaft to move the aforesaid pusher once after completion of each cycle to signal pulses, a paper feed means for line feed, a clutch and line feed cam on said drive shaft, means responsive to said line feed cam for operating said line feed means, and a stop finger for said clutch released by one of said probes when pushed.

28. A telegraph printer as defined in claim 2, in which there is a print hammer, a character feed drum for moving said print cylinder and print hammer across the paper being printed, a main clutch drive shaft, a clutch thereon, a pusher cam driven by said clutch, a function shaft, a cam follower engaging said pusher cam for oscillating said function shaft, clutch release means causing said function shaft to move the aforesaid pusher once after completion of each cycle of signal pulses, a resilient take-up drum for said first cable, a carriage return clutch and cam on said drive shaft, means responsive to said cam for releasing said character feed drum, whereby said take-up drum produces carriage return, and a stop finger for said carriage return clutch released by one of said probes when pushed.

29. A telegraph printer as defined in claim 2, in which there is a print hammer, a character feed drum for moving said print cylinder and print hammer across the paper being printed, a main clutch drive shaft, a clutch thereon, a pusher cam driven by said clutch, a function shaft, a cam follower engaging said pusher cam for oscillating said function shaft, clutch release means causing said function shaft to move the aforesaid pusher once after completion of each cycle of signal pulses, a paper feed means for line feed, a clutch and line feed cam on said drive shaft, means responsive to said line feed cam for operating said line feed means, and a stop finger for said clutch released by one of said probes when pushed, a resilient take-up drum for said first cable, a carriage return clutch and cam on said drive shaft, means responsive to said cam for releasing said character feed drum, whereby said take-up drum produces carriage return, and a stop finger for said carriage return clutch released by one of said probes when pushed.

30. A telegraph printer as defined in claim 2, in which there is a print hammer, a character feed drum for moving said print cylinder and print hammer across the paper being printed, a main clutch drive shaft, a clutch thereon, a pusher cam driven by said clutch, a function shaft, a cam follower engaging said pusher cam for oscillating said function shaft, clutch release means causing said function shaft to move the aforesaid pusher once after completion of each cycle of signal pulses, a paper feed means for line feed, a clutch and line feed cam on said drive shaft, means responsive to said line feed cam for operating said line feed means, a stop finger for said clutch operated by one of said probes when pushed, a resilient take-up drum for said first cable, a carriage return clutch and cam on said drive shaft, means responsive to said cam for releasing said character feed drum, whereby said take-up drum produces carriage return, and a stop finger for said carriage return clutch released by one of said probes when pushed, and means whereby both of said stop fingers are released automatically when character feed continues to the maximum distance available.

31. A telegraph printer as defined in claim 2, in which there is a print hammer, a character feed drum for moving said print cylinder and print hammer across the paper being printed, a main clutch drive shaft, a clutch thereon, a pusher cam driven by said clutch, a function shaft, a cam follower engaging said pusher cam for oscillating said function shaft, clutch release means causing said function shaft to move the aforesaid pusher once after completion of each cycle of signal pulses, a paper feed means for line feed, a clutch and line feed cam on said drive shaft, means responsive to said line feed cam for operating said line feed means, a stop finger for said clutch operated by one of said probes when pushed, a resilient take-up drum for said first cable, a carriage return clutch and cam on said drive shaft, means responsive to said cam for releasing said character feed drum, whereby said take-up drum produces carriage return, a stop finger for said carriage return clutch released by one of said probes when pushed, and means whereby both of said stop fingers are released automatically when character feed continues to the maximum distance available, said means including a cut-away probe on each stop finger in addition to the regular probe, and means to lift both of said cut-away probes into the path of the pusher regardless of the position of the slides.

32. In a telegraph printer having a type cylinder, a first cable and selector pulleys to move the cylinder axially, a second cable and selector pulleys to rotate the cylinder, and special function mechanism comprising a first slide moved longitudinally by the first cable, a collateral slide moved longitudinally by the second cable, a plurality of probes transversely movable relative to said slider, a print hammer, a character feed drum for moving said print cylinder and print hammer across the paper being printed, a main clutch drive shaft, a paper feed means for line feed, a clutch and line feed cam on said drive shaft, means responsive to said line feed cam for operating said line feed means, a stop finger for said clutch operated by one of said probes, a resilient take-up drum for said cylinder and hammer, a carriage return clutch and cam on said drive shaft, means responsive to said cam for releasing said character feed drum, whereby said take-up drum produces carriage return of the cylinder and hammer, and a stop finger for said carriage return clutch released by one of said probes.

33. In a telegraph printer having a type cylinder, a first cable and selector pulleys to move the cylinder axially, a second cable and selector pulleys to rotate the cylinder, and special function mechanism comprising a first slide moved longitudinally by the first cable, a collateral slide moved longitudinally by the second cable, a plurality of probes transversely movable relative to said slider, a print hammer, a character feed drum for moving said print cylinder and print hammer across the paper being printed, a main clutch drive shaft, a paper feed means for line feed, a clutch and line feed cam on said drive shaft, means responsive to said line feed cam for operating said line feed means, a stop finger for said clutch operated by one of said probes, a resilient take-up drum for said cylinder and hammer, a carriage return clutch and cam on said drive shaft, means responsive to said cam for releasing said character feed drum, whereby said take-up drum produces carriage return of the cylinder and hammer, a stop finger for said carriage return clutch released by one of said probes, and means whereby both of said stop fingers are released automatically when character feed continues to the maximum distance available.

34. A telegraph printer as defined in claim 2, in which there is a bell, a bell striker, and means whereby one of said probes when moved longitudinally causes the striker to ring the bell.

35. A telegraph printer as defined in claim 2, in which there is a main clutch drive shaft, a clutch thereon, a cam driven by said clutch, means to release the clutch after completion of each cycle of signal pulses, a function shaft, a cam follower engaging said cam for oscillating said function shaft, means whereby said function shaft serves to move the pusher, a bell, a bell striker, and means whereby one of said probes when pushed by said pusher causes the striker to ring the bell, a second cam and clutch on said drive shaft, a second cam follower, and bell disabling means moved by said cam follower to prevent said bell probe from ringing said bell.

36. A telegraph printer as defined in claim 2, in which there are a plurality of manually operable buttons, each button being arranged to move a probe.

37. A telegraph printer as defined in claim 25, in which there are a plurality of manually operable buttons, each button being arranged to move a probe.

38. A telegraph printer as defined in claim 30, in which there are a plurality of manually operable buttons, each button being arranged to move a probe.

References Cited in the file of this patent

UNITED STATES PATENTS 2,505,729    Zenner    Apr. 25, 1950
2,769,029    Howard    Oct. 30, 1956